United States Patent
Lee et al.

(10) Patent No.: US 12,554,414 B2
(45) Date of Patent: Feb. 17, 2026

(54) STORAGE DEVICE, MEMORY DEVICE, AND COMPUTING SYSTEM INCLUDING THE SAME

(71) Applicant: SAMSUNG ELECTRONICS CO., LTD., Suwon-si (KR)

(72) Inventors: Chon Yong Lee, Suwon-si (KR); Kyunghan Lee, Suwon-si (KR); Seongsik Hwang, Suwon-si (KR); Kyung-Chang Ryoo, Suwon-si (KR); Jae-Hoon Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/196,041

(22) Filed: May 11, 2023

(65) Prior Publication Data

US 2023/0376217 A1 Nov. 23, 2023

(30) Foreign Application Priority Data

May 23, 2022 (KR) ........................ 10-2022-0063121

(51) Int. Cl.
*G06F 3/06* (2006.01)
(52) U.S. Cl.
CPC .......... *G06F 3/0619* (2013.01); *G06F 3/0656* (2013.01); *G06F 3/0673* (2013.01)
(58) Field of Classification Search
CPC .... G06F 3/0619; G06F 3/0656; G06F 3/0673; G06F 3/0653; G06F 11/004; G06F 3/0679; G06F 3/0604; G06F 3/0608; G06F 3/0614; G06F 3/0625; G06F 3/0638
See application file for complete search history.

(56) References Cited

U.S. PATENT DOCUMENTS

| | | | |
|---|---|---|---|
| 9,990,023 B2 | 6/2018 | Paley et al. | |
| 10,761,590 B1 | 9/2020 | Dixon et al. | |
| 11,625,173 B1* | 4/2023 | Therene | G06F 3/0656 714/764 |
| 2007/0233700 A1* | 10/2007 | Tomonaga | G06F 3/0608 |
| 2010/0250830 A1 | 9/2010 | Stenfort | |
| 2016/0274802 A1* | 9/2016 | Koo | G06F 3/0616 |
| 2017/0024140 A1 | 1/2017 | Shivanand et al. | |
| 2017/0060768 A1 | 3/2017 | Zhang et al. | |
| 2017/0091042 A1 | 3/2017 | Chou et al. | |
| 2017/0242584 A1 | 8/2017 | Zhang et al. | |

(Continued)

FOREIGN PATENT DOCUMENTS

| | | | |
|---|---|---|---|
| CN | 106101270 A | * | 11/2016 |
| EP | 3992804 A1 | | 5/2022 |

*Primary Examiner* — Masud K Khan
(74) *Attorney, Agent, or Firm* — Sughrue Mion, PLLC

(57) ABSTRACT

A memory device is provided. The memory device includes: a buffer memory; and a memory controller configured to: obtain map data and meta data for recovering the map data from at least one external storage device; store the map data and the meta data obtained from the at least one external storage device in the buffer memory, the buffer memory being allocated for the at least one external storage device; translate a logical address corresponding to the at least one external storage device into a physical address of the buffer memory; and send the map data and the meta data to the at least one external storage device in response to detecting a sudden power-off event.

20 Claims, 23 Drawing Sheets

(56) References Cited

U.S. PATENT DOCUMENTS

| | | |
|---|---|---|
| 2018/0018111 A1* | 1/2018 | Byun .................... G06F 3/0632 |
| 2018/0024964 A1 | 1/2018 | Mao et al. |
| 2018/0081595 A1* | 3/2018 | Lee ...................... G06F 3/0626 |
| 2019/0138447 A1* | 5/2019 | Koo .................... G06F 12/1027 |
| 2019/0196960 A1 | 6/2019 | Lin |
| 2019/0213079 A1 | 7/2019 | Kim et al. |
| 2020/0109507 A1 | 4/2020 | Im et al. |
| 2020/0201548 A1 | 6/2020 | Yim et al. |
| 2021/0281639 A1 | 9/2021 | Kachare et al. |
| 2021/0311646 A1 | 10/2021 | Malladi et al. |
| 2021/0311895 A1 | 10/2021 | Das Sharma |

\* cited by examiner

FIG. 3

| Meta Data | refFin | ver | ID | typeofService | copyNum | copyAddr | depNum | depAddr | HCRC |

| SPOR Data | SPOR Data (Map table) | CRC |

STORAGE DEVICE, MEMORY DEVICE, AND COMPUTING SYSTEM INCLUDING THE SAME

CROSS-REFERENCE TO RELATED APPLICATION

This application claims priority under 35 U.S.C. § 119 to Korean Patent Application No. 10-2022-0063121 filed on May 23, 2022, in the Korean Intellectual Property Office, the disclosure of which is incorporated by reference herein in its entirety.

BACKGROUND

The present disclosure relates to a storage device in which a high-capacity dedicated buffer memory is not included, an external memory device including a high-capacity buffer allocated for the storage device, and a computing system including the storage device and the external memory device.

A semiconductor memory device may be classified as a volatile memory device, in which stored data disappear when a power is turned off, such as a static random access memory (SRAM) or a dynamic random access memory (DRAM), or a nonvolatile memory device, in which stored data are retained even when a power is turned off, such as a flash memory, a phase-change RAM (PRAM), a magnetic RAM (MRAM), a resistive RAM (RRAM), or a ferroelectric RAM (FRAM).

A storage device such as a solid state drive may include a nonvolatile memory device, such as a flash memory, to store data semi-permanently and may also include a volatile memory device, such as a DRAM, to store data temporarily.

As demand for a high-capacity server increases, demand for a high-capacity memory device also increases. Accordingly, various studies are being conducted on volatile memories provided for respective storage devices for the purpose of efficiently managing input/output data of the high-capacity memory device.

SUMMARY

Embodiments provide a storage device in which a high-capacity buffer is not included, and a method of operating an external memory device including a high-capacity buffer for the storage device.

Embodiments provide a method of safely storing data present in a memory device in a storage device in which a high-capacity buffer is not included, in the sudden power-off of the storage device and/or an external memory device including a high-capacity buffer for the storage device.

According to an aspect of an embodiment, a memory device includes: a buffer memory; and a memory controller configured to: obtain map data and meta data for recovering the map data from at least one external storage device; store the map data and the meta data obtained from the at least one external storage device in the buffer memory, the buffer memory being allocated for the at least one external storage device; translate a logical address corresponding to the at least one external storage device into a physical address of the buffer memory; and send the map data and the meta data to the at least one external storage device in response to detecting a sudden power-off event.

According to an aspect of an embodiment, a storage device includes: a nonvolatile memory device configured to store user data; and a storage controller configured to: generate map data corresponding to the nonvolatile memory device, which indicates a mapping relationship between a logical block address and a physical block address, and meta data for recovering the map data; send the map data and the meta data to an external memory device including a buffer memory allocated for the storage device; receive the map data and the meta data output from the external memory device in response to a sudden power-off event; and store the received map data and the received meta data in the nonvolatile memory device.

According to an aspect of an embodiment, a computing system includes: a plurality of storage devices, each of which includes a nonvolatile memory device and a storage controller configured to generate map data of the nonvolatile memory device and meta data for recovering the map data, the map data indicating a mapping relationship between a logical block address and a physical block address; and a memory device including a memory controller configured to obtain the map data and the meta data from the plurality of storage devices, and a buffer memory configured to store the map data and the meta data, the buffer memory being allocated for the plurality of storage devices. The memory controller is configured to send the map data and the meta data to the plurality of storage devices in response to detecting a sudden power-off event.

BRIEF DESCRIPTION OF DRAWINGS

The above and other aspects and features of the present disclosure will be more clearly understood from the following description of embodiments, taken in conjunction with the accompanying drawings.

FIG. 3 illustrates an example of meta data and sudden power-off recovery (SPOR) data stored in CXL storage in sudden power-off according to an embodiment.

DETAILED DESCRIPTION

Below, embodiments will be describe with reference to the accompanying drawings. Embodiments described herein are provided as examples, and thus, the present disclosure is not limited thereto, and may be realized in various other forms. Each embodiment provided in the following description is not excluded from being associated with one or more features of another example or another embodiment also provided herein or not provided herein but consistent with the present disclosure.

In the detailed description, components described with reference to the terms "unit", "module", "block", "~er or ~or", etc. and function blocks illustrated in drawings will be implemented with software, hardware, or a combination thereof. For example, the software may be a machine code, firmware, an embedded code, and application software. For example, the hardware may include an electrical circuit, an electronic circuit, a processor, a computer, an integrated circuit, integrated circuit cores, a pressure sensor, an inertial sensor, a microelectromechanical system (MEMS), a passive element, or a combination thereof.

Figure 1:
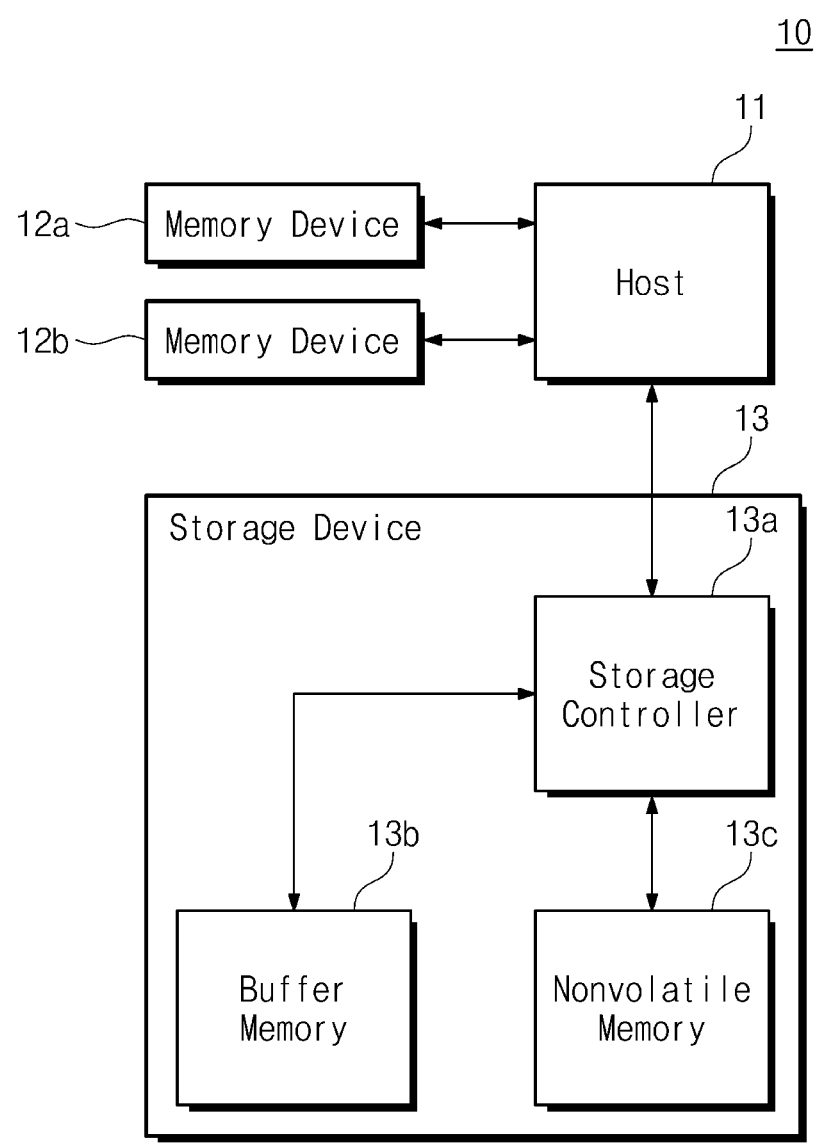
FIG. 1 is a block diagram illustrating a computing system including a storage device.

FIG. 1 is a block diagram illustrating a computing system including a storage device. Referring to FIG. 1, a computing system 10 may include a host 11, a plurality of memory devices 12a and 12b, and a storage device 13. The host 11 may control an overall operation of the computing system 10. The plurality of memory devices 12a and 12b may be used as a working memory or a system memory of the host 11.

The storage device 13 may include a storage controller 13a, a buffer memory 13b, and a nonvolatile memory 13c. Under control of the host 11, the storage controller 13a may store data in the nonvolatile memory 13c or may send data stored in the nonvolatile memory 13c to the host 11.

The buffer memory 13b may store a variety of information necessary for the storage device 13 to operate. For example, the storage controller 13a may manage data stored in the nonvolatile memory 13c by using map data. The map data may include information about relationship between a logical block address managed by the host 11 and a physical block address of the nonvolatile memory 13c.

In an embodiment, the buffer memory 13b may be a high-speed memory such as a DRAM. As the capacity of the nonvolatile memory 13c increases, the size of necessary map data may increase. However, because the capacity of the buffer memory 13b included in the single storage device 13 is limited, the buffer memory 13b may not be able to store the increased map data that is needed due to the increase in the capacity of the nonvolatile memory 13c.

Figure 2:
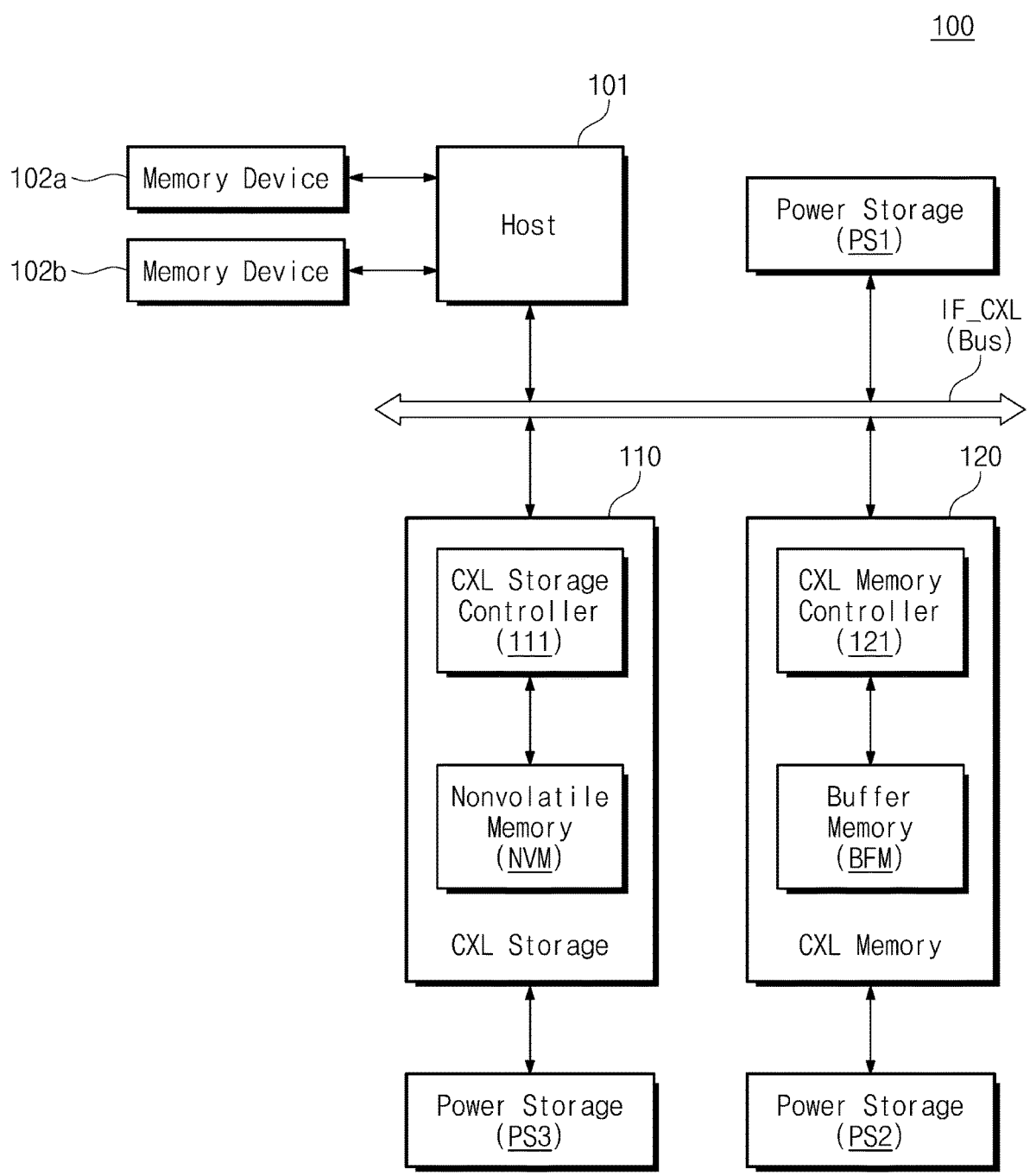
FIG. 2 is a block diagram illustrating a computing system according to an embodiment.

FIG. 2 is a block diagram illustrating a computing system to which a storage system according to an embodiment is applied. Referring to FIG. 2, a computing system 100 may include a host 101, a plurality of memory devices 102a and 102b, Compute eXpress Link (CXL) storage 120, and a CXL memory 120. In an embodiment, the computing system 100 may be included in user devices such as a personal computer, a laptop computer, a server, a media player, and a digital camera or automotive devices such as a navigation system, a black box, and an automotive electronic device/part. Alternatively, the computing system 100 may be a mobile system such as a mobile phone, a smartphone, a tablet personal computer (PC), a wearable device, a health care device, or an Internet of things (IoT) device.

The host 101 may control an overall operation of the computing system 100. In an embodiment, the host 101 may be one of various processors such as a central processing unit (CPU), a graphics processing unit (GPU), a neural processing unit (NPU), and a data processing unit (DPU). In an embodiment, the host 101 may include a single core processor or a multi-core processor.

The plurality of memory devices 102a and 102b may be used as a main memory or a system memory of the computing system 100. In an embodiment, each of the plurality of memory devices 102a and 102b may be a dynamic random access memory (DRAM) device and may have the form factor of the dual in-line memory module (DIMM). However, embodiments are not limited thereto. For example, the plurality of memory devices 102a and 102b may include a nonvolatile memory such as a flash memory, a phase change RAM (PRAM), a resistive RAM (RRAM), or a magnetic RAM (MRAM).

The plurality of memory devices 102a and 102b may each include an interface to directly communicate with the host 101, such as a Double Data Rate (DDR) interface. In an embodiment, the host 101 may include a memory controller configured to control the plurality of memory devices 102a and 102b. However, embodiments are not limited thereto. For example, the plurality of memory devices 102a and 102b may communicate with the host 101 through various interfaces.

The CXL storage 110 may include a CXL storage controller 111 and a nonvolatile memory NVM. Under control of the host 101, the CXL storage controller 111 may store data in the nonvolatile memory NVM or may send data stored in the nonvolatile memory NVM to the host 101. In an embodiment, the nonvolatile memory NVM may be a NAND flash memory, but embodiments are not limited thereto.

The CXL memory 120 may include a CXL memory controller 121 and the buffer memory BFM. Under control of the host 101, the CXL memory controller 121 may store data in the buffer memory BFM or may send data stored in the buffer memory BFM to the host 101. In an embodiment, the buffer memory BFM may be a DRAM, but embodiments are not limited thereto.

FIG. 3 illustrates an example of meta data and sudden power-off recovery (SPOR) data stored in CXL storage in sudden power-off.

Referring to FIGS. 2 and 3, when utilizing the computing system 100, a sudden power-off (SPO) event can arise. The SPO event may arise because of various events including local area power-off, malfunction of power elements of the computing system 100, etc. The SPO event may arise critical problems such as data loss, system panic due to the data loss, etc. In order to prevent such problems, when the SPO event occurs, the CXL memory controller 121 may back up data, which requires backup, from among data stored in the buffer memory BFM of the CXL memory 120 to the nonvolatile memory NVM of the CXL storage 110. The backup-required data may include SPOR data to be recovered in a SPOR operation, and meta data used as a header for retrieving the SPOR data.

In an embodiment, the SPOR data may include map data indicating information about a relationship between a logical block address managed by the host 101 and a physical block address of the nonvolatile memory NVM in the CXL storage 110, and CRC data for guaranteeing the integrity of data.

In an embodiment, the meta data may include 1) a field refFin for checking whether SPOR data are up-to-date, 2) a version number ver of stored SPOR data, 3) an identifier ID of a device that originally uses the SPOR data (i.e., an identifier ID of the CXL memory 120 that stores the meta data before the occurrence of the SPO), 4) a flag typeofService indicating whether the SPOR data are stored in single CXL storage, whether the SPOR data are copied and stored in multiple CXL storages, or whether the SPOR data are divided and stored in multiple CXL storages, 5) when a copy of the SPOR data is stored in another CXL storage, a flag copyNum indicating a number of the copy, 6) an identifier copyAddr of a storage device where the copy of the SPOR data is stored, 7) when the stored SPOR data are divided and stored in CXL storages, a flag depNum indicating a number of a file, 8) an identifier depAddr of CXL storage where another divided SPOR data are stored, and 9) checksum data HCRC for a header (i.e., metadata).

Returning to FIG. 2, in an embodiment, the host 101, the CXL storage 110, and the CXL memory 120 may be configured to share the same interface. For example, the host 101, the CXL storage 110, and the CXL memory 120 may communicate with each other through a CXL interface IF_CXL. In an embodiment, the CXL interface IF_CXL may indicate a low-latency and high-bandwidth link that supports coherency, memory access, and dynamic protocol multiplexing of input and output protocols such that various connections between accelerators, memory devices, or various electronic devices are possible.

In an embodiment, unlike the storage device 13 of FIG. 1, the CXL storage 110 may not include a separate buffer memory for storing or managing map data. In this case, the CXL storage 110 may require a buffer memory for storing or managing the map data. In an embodiment, at least a partial area of the CXL memory 120 may be used as a buffer memory of the CXL storage 110. In this case, a mapping table that is managed by the CXL storage controller 111 of the CXL storage 110 may be stored in the CXL memory 120. For example, at least a partial area of the CXL memory 120 may be allocated for a buffer memory of the CXL storage 110 (i.e., for an area dedicated for the CXL storage 110) by the host 101.

In an embodiment, the CXL storage 110 may access the CXL memory 120 through the CXL interface IF_CXL. For example, the CXL storage 110 may store the mapping table in the allocated area of the CXL memory 120 or may read the mapping table from the allocated area of the CXL memory 120. Under control of the CXL storage 110, the CXL memory 120 may store data (e.g., the map data) in the buffer memory BFM or may send the data (e.g., the map data) stored in the buffer memory BFM to the CXL storage 110.

As described with reference to FIG. 1, a related storage device 13 stores and manages the map data by using the buffer memory 13b included therein. As the capacity of the storage device 13 increases, the size of the map data increase, which necessitates an increase in the capacity of the buffer memory 13b included in the storage device 13. However, there is a limitation on an increase in capacity due to the structure and physical characteristic of the buffer memory 13b included in the storage device 13.

In contrast, according to an embodiment, the CXL storage 110 may use at least a partial area of the CXL memory 120 placed outside the CXL storage 110 as a buffer memory. In this case, because the CXL memory 120 is implemented independently of the CXL storage 110, the CXL memory 120 may be implemented with a high-capacity memory. As such, even though the size of the map data increases due to an increase in the capacity of the CXL storage 110, the map data may be normally managed by the CXL memory 120.

In an embodiment, the storage controller 13a of the related storage device 13 communicates with the host 11 through the host interface such as Peripheral Component Interconnect Express (PCIe) or NVM Express (NVMe), and communicates with the buffer memory 13b through the memory interface such as a DDR interface or a Low-Power Double Data Rate (LPDDR) interface. That is, the storage controller 13a of the related storage device 13 communicates with the host 11 and the buffer memory 13b included therein, through different interfaces (i.e., heterogeneous interfaces).

In contrast, according to an embodiment, the CXL storage controller 111 of the CXL storage 110 may communicate with both the host 101 and the CXL memory 120 (i.e., a buffer memory) through the CXL interface IF_CXL. In other words, the CXL storage controller 111 of the CXL storage 110 may communicate with the host 101 and the CXL memory 120 through a homogeneous interface or a common interface and may use a partial area of the CXL memory 120 as a buffer memory.

Below, for convenience of description, it is assumed that the host 101, the CXL storage 110, and the CXL memory 120 communicate with each other through the CXL interface IF_CXL. However, embodiments are not limited thereto. For example, the host 101, the CXL storage 110, and the CXL memory 120 may communicate with each other based on various computing interfaces complying with the following: GEN-Z protocol, NVLink protocol, Cache Coherent Interconnect for Accelerators (CCIX) protocol, and Open Coherent Accelerator Processor Interface (CAPI) protocol.

Figure 4:
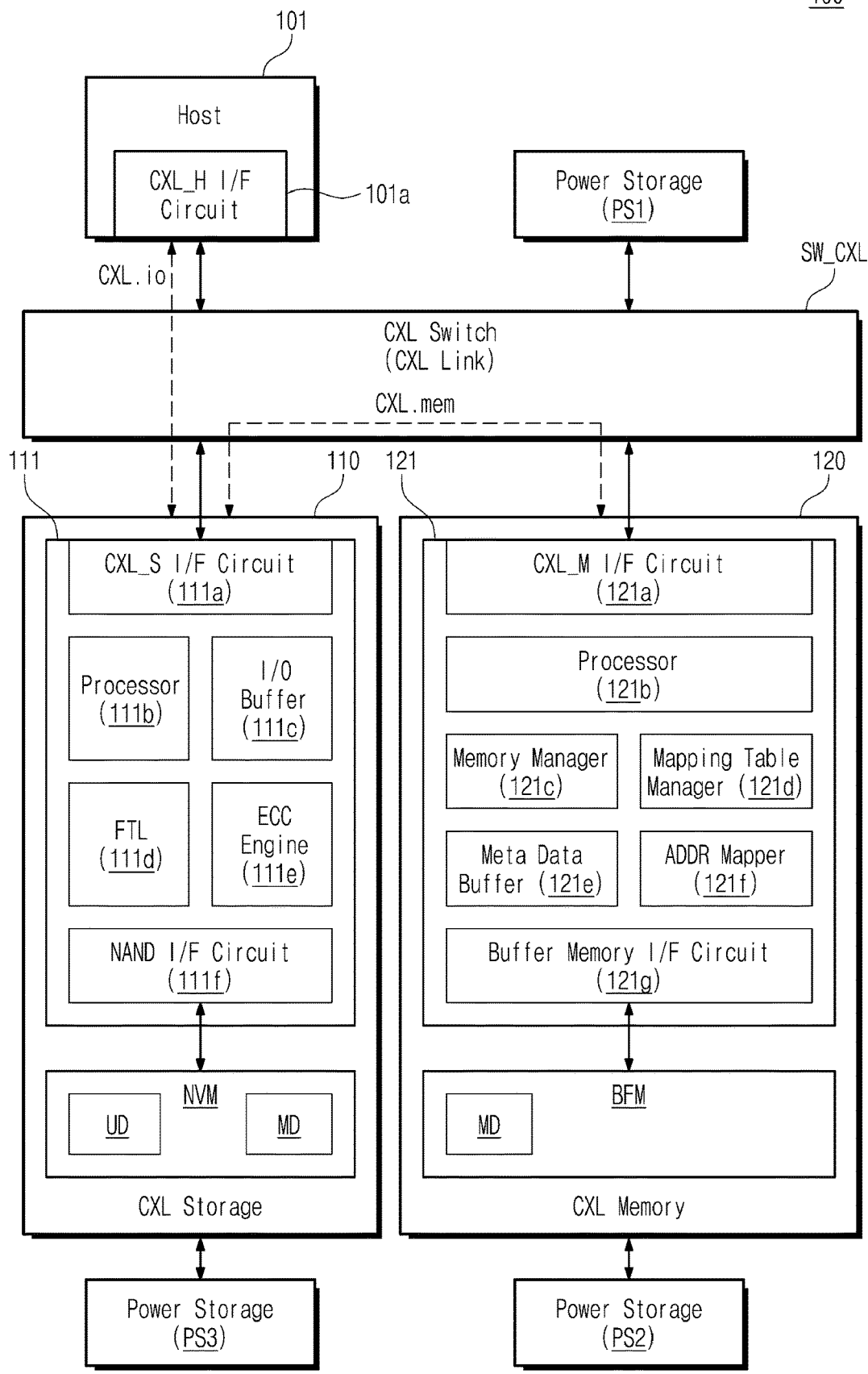
FIG. 4 is a block diagram illustrating components of a computing system according to an embodiment.

FIG. 4 is a block diagram illustrating components of a computing system of FIG. 2 in detail. Referring to FIGS. 2 to 4, the computing system 100 may include a CXL switch SW_CXL, the host 101, the CXL storage 110, and the CXL memory 120.

The CXL switch SW_CXL may be a component included in the CXL interface IF_CXL. The CXL switch SW_CXL may be configured to arbitrate the communication between the host 101, the CXL storage 110, and the CXL memory 120. For example, when the host 101 and the CXL storage 110 communicate with each other, the CXL switch SW_CXL may be configured to send information, which is provided from the host 101 or the CXL storage 110, such as a request, data, a response, or a signal to the CXL storage 110 or the host 101. When the host 101 and the CXL memory 120 communicate with each other, the CXL switch SW_CXL may be configured to send information, which is provided from the host 101 or the CXL memory 120, such as a request, data, a response, or a signal to the CXL memory 120 or the host 101. When the CXL storage 110 and the CXL memory 120 communicate with each other, the CXL switch SW_CXL may be configured to send information, which is provided from the CXL storage 110 or the CXL memory 120, such as a request, data, a response, or a signal to the CXL memory 120 or the CXL storage 110.

The host 101 may include a CXL host interface circuit 101a. The CXL host interface circuit 101a may communicate with the CXL storage 110 or the CXL memory 120 through the CXL switch SW_CXL.

In an embodiment, a configuration of the CXL storage 110 may be different from configurations of related storages. For example, the related storage device (e.g., an SSD including a DRAM buffer) stores and manages map data in the DRAM buffer included in the related storage device. In this case, a high-capacity DRAM buffer for storing the map data may be included in the related storage device. Alternatively, another type of related storage device (e.g., a DRAM-less SSD or a DRAM-less memory card) may store the entire map data in a nonvolatile memory (e.g., a NAND flash memory) included in the related storage device and loads and uses a portion of the map data onto an SRAM buffer. In this case, to load the map data, the nonvolatile memory, which has an operating speed lower than that of the DRAM buffer, is frequently performed, thereby reducing the performance of operation.

In contrast, the CXL storage 110 according to the present disclosure may not include a separate DRAM buffer configured to store the map data. In this case, map data MD may be stored and managed in the CXL memory 120 placed outside the CXL storage 110. As will be described below, because the CXL memory 120 supports a fast operating speed, the CXL storage 110 may have the same performance as the related storage device (e.g., a storage device including a DRAM). In addition, because the CXL memory 120 is placed outside the CXL storage 110, a large amount of map data of the CXL storage 110 may be managed.

The CXL storage 110 may include the CXL storage controller 111 and the nonvolatile memory NVM. The CXL storage controller 111 may include a CXL storage interface circuit 111a, a processor 111b, an input/output buffer 111c, a flash translation layer (FTL) 111d, an error correction code (ECC) engine 111e, and a NAND interface circuit 111f.

The CXL storage interface circuit 111a may be connected with the CXL switch SW_CXL. The CXL storage interface circuit 111a may communicate with the host 101 or the CXL memory 120 through the CXL switch SW_CXL.

The processor 111b may be configured to control an overall operation of the CXL storage controller 111. The input/output buffer 111c may be used as a working memory or a buffer memory of the CXL storage controller 111. In an embodiment, the input/output buffer 111c may be an SRAM and may be used as a read buffer and a write buffer for the CXL storage 110. In an embodiment, as will be described below, the input/output buffer 111c may be configured to temporarily store the map data MD read from the CXL memory 120 or a portion of the map data MD.

The FTL 111d may perform various management operations for efficiently using the nonvolatile memory NVM. For example, the FTL 111d may perform address translation between a logical block address managed by the host 101 and a physical block address used in the nonvolatile memory NVM, based on map data (or a mapping table). The FTL 111d may perform a bad block management operation for the nonvolatile memory NVM. The FTL 111d may perform a wear leveling operation for the nonvolatile memory NVM. The FTL 111d may perform a garbage collection operation for the nonvolatile memory NVM.

In an embodiment, the FTL 111d may be implemented in the form of hardware, firmware, or software, or in the form of a combination thereof. In the case where the FTL 111d is implemented in the form of firmware or software, program codes associated with the FTL 111d may be stored in the input/output buffer 111c and may be driven by the processor 111b. In the case where the FTL 111d is implemented by hardware, hardware components configured to perform the above management operations may be implemented in the CXL storage controller 111.

The ECC engine 111e may perform error detection and correction on data read from the nonvolatile memory NVM. For example, the ECC engine 111e may generate parity bits for user data UD to be stored in the nonvolatile memory NVM, and the parity bits thus generated may be stored in the nonvolatile memory NVM together with the user data UD. When the user data UD are read from the nonvolatile memory NVM, the ECC engine 111e may detect and correct an error of the user data UD by using the parity bits read from the nonvolatile memory NVM together with the user data UD.

The NAND interface circuit 111f may control the nonvolatile memory NVM such that data are stored in the nonvolatile memory NVM or data are read from the nonvolatile memory NVM. In an embodiment, the NAND interface circuit 111f may be implemented to comply with the standard protocol such as a toggle interface or Open NAND Flash Interface (ONFI). For example, the nonvolatile memory NVM may include a plurality of NAND flash devices; in the case where the NAND interface circuit 111f is implemented based on the toggle interface, the NAND interface circuit 111f may communicate with the plurality of NAND flash devices through a plurality of channels. The plurality of NAND flash devices may be connected with the plurality of channels through a multi-channel, multi-way structure.

The NAND interface circuit 111f may send a chip enable signal/CE, a command latch enable signal CLE, an address latch enable signal ALE, a read enable signal/RE and a write enable signal/WE to the plurality of NAND flash devices through the plurality of channels. The NAND interface circuit 111f and each NAND flash device may exchange a data signal DQ and a data strobe signal DQS through each channel.

TABLE 1

| /CE | CLE | ALE | /WE | /RE | DQS | DQx | MODE |
|---|---|---|---|---|---|---|---|
| L | H | L | ↑ | H | X | CMD | Command Input |
| L | L | H | ↑ | H | X | ADDR | Address Input |
| L | L | L | H | H | ↑↓ | DATA_in | Data Input |
| L | L | L | H | ↑↓ | ↑↓ | DATA_out | Data Output |

Table 1 shows operating modes of a NAND flash device according to a state of each signal. Referring to Table 1, while the NAND flash device receives a command CMD or an address ADDR or receives/outputs data "DATA", the chip enable signal/CE maintains a low level "L". During a command input mode, the NAND interface circuit 111f may control signal lines such that the command latch enable signal CLE has a high level "H", the address latch enable signal ALE has the low level "L", the write enable signal/WE toggles between the high level "H" and the low level "L" and the read enable signal/RE has the high level "H". During the command input mode, the NAND interface circuit 111f may send the command CMD to the NAND flash device through data signals DQx in synchronization with the rising edge ↑ of the write enable signal/WE. The NAND flash device may identify the command CMD from the data signals DQx in response to the rising edge ↑ of the write enable signal/WE.

During an address input mode, the NAND interface circuit 111f may control signal lines such that the command latch enable signal CLE has the low level "L", the address latch enable signal ALE has the high level "H", the write enable signal/WE toggles between the high level "H" and the low level "L", and the read enable signal/RE has the high level "H". During the address input mode, the NAND interface circuit 111f may send the address ADDR to the NAND flash device through the data signals DQx in synchronization with the rising edge ↑ of the write enable signal/WE. The NAND flash device may identify the address ADDR from the data signals DQx in response to the rising edge ↑ of the write enable signal/WE. In an embodiment, the address ADDR may be a value corresponding to a physical block address of the NAND flash device.

During a data input mode, the NAND interface circuit 111f may control signal lines such that the command latch enable signal CLE has the low level "L", the address latch enable signal ALE has the low level "L", the write enable signal/WE has the high level "H", the read enable signal/RE has the high level "H", and the data strobe signal DQS toggles between the high level "H" and the low level "L". During the data input mode, the NAND interface circuit 111f may send the data "DATA" to the NAND flash device through the data signals DQx in synchronization with the rising edge and the falling edge ↑ of the data strobe signal DQS. The NAND flash device may identify the data "DATA" from the data signals DQx in response to the rising edge ↑ and the falling edge ↑ of the data strobe signal DQS.

During a data output mode, the NAND interface circuit 111f may control signal lines that the command latch enable signal CLE has the low level "L", the address latch enable signal ALE has the low level "L", the write enable signal H has the high level "H", and the read enable signal/RE toggles between the high level "H" and the low level "L". During the data output mode, the NAND flash device may generate the data strobe signal DQS toggling between the high level "H" and the low level "L" in response to the read enable signal/RE. The NAND flash device may send the data "DATA" to the NAND interface circuit 111f through the data signals DQx in synchronization with the rising edge ↑ and the falling edge ↑ of the data strobe signal DQS. The NAND interface circuit 111f may identify the data "DATA" from the data signals DQx in response to the rising edge ↑ and the falling edge ↑ of the data strobe signal DQS.

The toggle interface described above is an example, and embodiments are not limited thereto.

The nonvolatile memory NVM may store or output the user data UD under control of the CXL storage controller 111. The nonvolatile memory NVM may store or output the map data MD under control of the CXL storage controller 111. In an embodiment, the map data MD stored in the nonvolatile memory NVM may include mapping information corresponding to the entire user data UD stored in the nonvolatile memory NVM. The map data MD stored in the nonvolatile memory NVM may be stored in the CXL memory 120 in the initialization operation of the CXL storage 110.

The CXL memory 120 may include the CXL memory controller 121 and the buffer memory BFM. The CXL memory controller 121 may include a CXL memory interface circuit 121a, a processor 121b, a memory manager 121c, a mapping table manager 121d, a meta data buffer 121e, an address mapper 121f, and a buffer memory interface circuit 121g. Power storages PS1, PS2, and PS3 may be respectively connected with the CXL storage 110, the CXL memory 120, and the CXL switch SW_CXL. The power storages PS1, PS2, and PS3 may supply powers for storing data (e.g., the map data MD and the meta data), which require backup, from among data stored in the CXL memory 120 in the CXL storage 110 in the sudden power-off (SPO).

The CXL memory interface circuit 121a may be connected with the CXL switch SW_CXL. The CXL memory interface circuit 121a may communicate with the host 101 or the CXL storage 110 through the CXL switch SW_CXL.

The processor 121b may control an overall operation of the CXL memory controller 121.

The memory manager 121c may be configured to manage the buffer memory BFM. When the sudden power-off (SPO) event occurs, the memory manager 121c may manage data (e.g., the map data MD and the meta data) requiring backup from among the data present in the buffer memory BFM. For example, the memory manager 121c may obtain the map data MD and the meta data from the CXL storage 110 through the CXL switch SW_CXL periodically or non-periodically (or randomly). In addition, the memory manager 121c may collect information about the CXL storage 110 through the CXL switch SW_CXL periodically or non-periodically (or randomly). For example, the information about the CXL storage 110 may include an available capacity of the nonvolatile memory NVM in the CXL storage 110 and a remaining capacity of the power storage PS connected with the CXL storage 110.

The mapping table manager 121d may manage the map data MD to be stored in the buffer memory BFM and/or the map data MD read from the buffer memory BFM. For example, the mapping table manager 121d may participate in an operation of storing the map data MD in the buffer memory BFM when the map data MD are updated and/or an operation of reading the map data MD from the buffer memory BFM in the sudden power-off (SPO).

The meta data buffer 121e may temporally store the map data MD and the meta data to be stored in the buffer memory BFM when the map data MD and the meta data are updated and/or the map data MD and the meta data read from the buffer memory BFM in the sudden power-off (SPO). The address mapper 121f may be configured to translate a memory address (e.g., a logical address or a virtual address) accessed from the host 101 or the CXL storage 110 into a physical address for the buffer memory BFM. In an embodiment, the memory address that is an address for managing a storage area of the CXL memory 120 may be a logical address or a virtual address that is designated and managed by the host 101.

The buffer memory interface circuit 121g may control the buffer memory BFM such that data are stored in the buffer memory BFM or data are read from the buffer memory BFM. In an embodiment, the buffer memory interface circuit 121g may be implemented to comply with the standard protocol for the buffer memory BFM, such as a DDR interface or an LPDDR interface.

Under control of the CXL memory controller 121, the buffer memory BFM may store data or may output the stored data. In an embodiment, the buffer memory BFM may be configured to store the map data MD that are used in the CXL storage 110. The map data MD may be transferred from the CXL storage 110 to the CXL memory 120 when the computing system 100 is initialized or the CXL storage 110 is initialized.

When the sudden power-off (SPO) event occurs, the power storages PS1, PS2, and PS3 may supply the power that is necessary for the memory manager 121c to back up data (e.g., the map data MD) requiring backup from among the data of the buffer memory BFM to the CXL storage 110. For example, the power storage PS1 may supply the power to the CXL switch SW_CXL, the power storage PS2 may supply the power to the CXL storage 110, and the power storage PS3 may supply the power to the CXL memory 120. Each of the power storages PS1, PS2 and PS3 may include a capacitor such as a super capacitor or a tantalum capacitor.

The above components of the CXL memory controller 121 may be implemented in the form of hardware, software, or a combination thereof. For example, the memory manager 121c and the mapping table manager 121d that perform operations associated with a control path/function may be implemented in the form of software or firmware that is executed by the processor 121b. In contrast, the meta data buffer 121e and the address mapper 121f that perform operations associated with a data path/function may be implemented in the form of hardware for the purpose of improving performance. However, how the components of the CXL memory controller 121 are implemented is not limited thereto.

As described above, the CXL storage 110 according to an embodiment may store the map data MD, which are necessary to manage the nonvolatile memory NVM, in the CXL memory 120 connected through the CXL switch SW_CXL (or the CXL interface IF_CXL). Afterwards, when the CXL storage 110 performs the read operation according to a request of the host 101, the CXL storage 110 may read at least a portion of the map data MD from the CXL memory 120 through the CXL switch SW_CXL (or the CXL interface IF_CXL) and may perform the read operation based on the map data MD thus read. Alternatively, when the CXL storage 110 performs the write operation according to a request of the host 101, the CXL storage 110 may perform the write operation on the nonvolatile memory NVM and may update the map data MD. In this case, the updated map data MD may be first stored in the input/output buffer 111c of the CXL storage controller 111, and the map data MD stored in the input/output buffer 111c may be transferred to the buffer memory BFM of the CXL memory 120 through the CXL switch SW_CXL (or the CXL interface IF_CXL), so as to be updated in the buffer memory BFM.

In an embodiment, at least a partial area of the buffer memory BFM of the CXL memory 120 may be allocated for a dedicated area for the CXL storage 110, and the remaining area may be used as an area that is capable of being accessed by the host 101.

In an embodiment, the host 101 and the CXL storage 110 may communicate with each other by using an input/output protocol, such as CXL.io. The CXL.io may be a PCIe-based non-coherency input/output protocol. The host 101 and the CXL storage 110 may exchange user data or variety of information with each other by using the CXL.io.

In an embodiment, the CXL storage 110 and the CXL memory 120 may communicate with each other by using a memory access protocol, such as CXL.mem. The CXL.mem may be a memory access protocol that supports memory access. The CXL storage 110 may access a partial area (e.g., an area where the map data MD are stored or a CXL storage-dedicated area) of the CXL memory 120 by using the CXL.mem.

In an embodiment, the host 101 and the CXL memory 120 may communicate with each other by using CXL.mem. The host 101 may access, as a system memory, the remaining area (e.g., the remaining area other than the area where the map data MD are stored or the remaining area other than the CXL storage-dedicated area) of the CXL memory 120 by using the CXL.mem.

The above access types including CXL.io and CXL.mem are provided as an example, and embodiments are not limited thereto.

In an embodiment, the CXL storage 110 and the CXL memory 120 may be installed in a CXL interface-based physical port (e.g., a PCIe physical port). In an embodiment, the CXL storage 110 and the CXL memory 120 may be implemented based on the E1.S, E1.L, E3.S, E3.L, or PCIe AIC (CEM) form factor. Alternatively, the CXL storage 110 and the CXL memory 120 may be implemented based on the U.2 form factor, the M.2 form factor, various different types of PCIe-based form factors, or various different types of small form factors. As will be described with reference to FIG. 14, the CXL storage 110 and the CXL memory 120 may be implemented with various types of form factors, and may support a function of a hot-plug capable of being installed in (or added to) or removed from the physical port.

Figure 5:
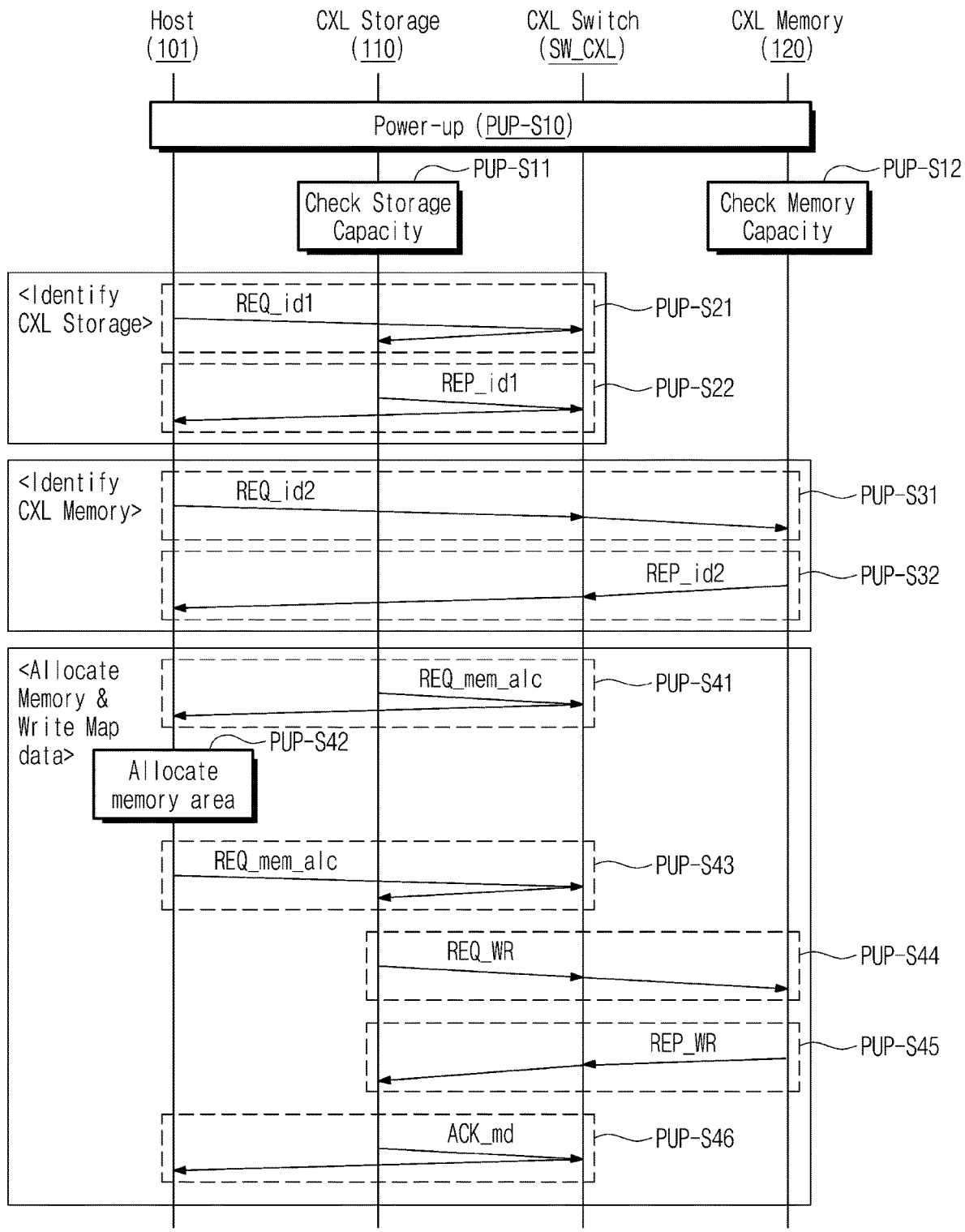
FIG. 5 is a flowchart illustrating an initialization operation or a power-up operation of a computing system according to an embodiment.

FIG. 5 is a flowchart illustrating an initialization operation or a power-up operation of a computing system of FIG. 4. Referring to FIGS. 4 and 5, in operation PUP-S10, the computing system 100 may be powered up. When the computing system 100 is powered up, the host 101 may send information about power-up or initialization start to the CXL storage 110, the CXL switch SW_CXL, and the CXL memory 120. In response to the power-up or initialization start information, each of the CXL storage 110, the CXL switch SW_CXL, and the CXL memory 120 may perform an individual initialization operation.

In operation PUP-S11, the CXL storage 110 may check a storage capacity (i.e., a capacity of the nonvolatile memory NVM). For example, the CXL storage 110 may check the storage capacity of the nonvolatile memory NVM in response to the information about power-up or initialization start.

In operation PUP-S12, the CXL memory 120 may check a memory capacity (i.e., a capacity of the buffer memory BFM). For example, the CXL memory 120 may check the capacity of the buffer memory BFM in response to the power-up or initialization start information.

The host 101 may recognize information of the CXL storage 110 through operation PUP-S21 and operation PUP-522. For example, in operation PUP-521, the host 101 may issue a first device information request REQ_id1 for recognizing device information of the CXL storage 110 through the CXL host interface circuit 101a. The first device information request REQ_id1 may be transferred to the CXL switch SW_CXL. The CXL switch SW_CXL may transfer the first device information request REQ_id1 to the CXL storage 110 targeted for the first device information request REQ_id1.

In operation PUP-S22, the CXL storage 110 may output a first device information response REP_id1 through the CXL storage interface circuit 111a in response to the first device information request REQ_id1 received from the CXL switch SW_CXL. The first device information response REP_id1 may be transferred to the CXL switch SW_CXL. The CXL switch SW_CXL may transfer the first device information response REP_id1 to the host 101 targeted for the first device information response REP_id1.

The host 101 may identify the device information of the CXL storage 110 in response to the first device information response REP_id1 received from the CXL switch SW_CXL. In an embodiment, the first device information response REP_id1 may include information about a device type and a storage capacity of the CXL storage 110.

The host 101 may recognize information of the CXL memory 120 through operation PUP-S31 and operation PUP-S32. For example, in operation PUP-S31, the host 101 may issue a second device information request REQ_id2 for recognizing device information of the CXL memory 120 through the CXL host interface circuit 101a. The second device information request REQ_id2 may be transferred to the CXL switch SW_CXL. The CXL switch SW_CXL may transfer the second device information request REQ_id2 to the CXL memory 120 targeted for the second device information request REQ_id2.

In operation PUP-S32, the CXL memory 120 may output a second device information response REP_id2 through the CXL memory interface circuit 121a in response to the second device information request REQ_id2 received from the CXL switch SW_CXL. The second device information response REP_id2 may be transferred to the CXL switch SW_CXL. The CXL switch SW_CXL may transfer the second device information response REP_id2 to the host 101 targeted for the second device information response REP_id2.

The host 101 may identify the device information of the CXL memory 120 in response to the second device information response REP_id2 received from the CXL switch SW_CXL. In an embodiment, the second device information response REP_id2 may include information about a device type and a storage capacity of the CXL memory 120.

As described above, the host 101 may identify the information about the device types (e.g., a storage type and a memory type) and capacities of the CXL storage 110 and the CXL memory 120 through operation PUP-S21 to operation PUP-532.

The host 101 may allocate at least a partial area of the CXL memory 120 for an area dedicated for the CXL storage 110 through operation PUP-S41 to operation PUP-S46. For example, in operation PUP-S41, the CXL storage 110 may output a memory allocation request REQ_mem_alc through the CXL storage interface circuit 111a. The memory allocation request REQ_mem_alc may be transferred to the CXL switch SW_CXL. The CXL switch SW_CXL may transfer the memory allocation request REQ_mem_alc to the host 101. In an embodiment, the memory allocation request REQ_mem_alc may refer to an allocation request for an area, which is to be used as a dedicated area of the CXL storage 110, from among areas of the CXL memory 120.

In operation PUP-S42, the host 101 may allocate at least a partial area of the CXL memory 120 for the dedicated area of the CXL storage 110 in response to the memory allocation request REQ_mem_alc. For example, the host 101 may determine a buffer capacity required by the CXL storage 110 based on the storage capacity of the CXL storage 110. The host 101 may allocate the area of the CXL memory 120, which corresponds to the determined buffer capacity, for the dedicated area of the CXL storage 110.

In operation PUP-S43, the host 101 may output a memory allocation response REP_mem_alc through the CXL host interface circuit 101a. The memory allocation response REP_mem_alc may be transferred to the CXL switch SW_CXL. The CXL switch SW_CXL may transfer the memory allocation response REP_mem_alc to the CXL storage 110 targeted for the memory allocation response REP_mem_alc. In an embodiment, the memory allocation response REP_mem_alc may include information about a device identifier of the CXL memory 120 and a memory address (e.g., a logical address range or a virtual address range) of an area of the CXL memory 120, which is allocated for a dedicated area of the CXL memory 120.

The CXL storage 110 may identify the area of the CXL memory 120, which is dedicated for the CXL storage 110, based on the memory allocation response REP_mem_alc.

In operation PUP-S44, the CXL storage 110 may output a write request REQ_WR through the CXL storage interface circuit 111a. The write request REQ_WR may be transferred to the CXL switch SW_CXL. The CXL switch SW_CXL may transfer the write request REQ_WR to the CXL memory 120 targeted for the write request REQ_WR. The CXL memory 120 may perform the write operation in response to the write request REQ_WR.

In operation PUP-S45, the CXL memory 120 may output, through the CXL memory interface circuit 121a, a write response REP_WR providing notification that the write request is completed. The CXL switch SW_CXL may transfer the write response REP_WR to the CXL storage 110 targeted for the write response REP_WR. The CXL storage 110 may recognize that the write operation is completely performed on the CXL memory 120, in response to the write response REP_WR.

In an embodiment, the write request REQ_WR may refer to a request for storing the map data MD present in the nonvolatile memory NVM of the CXL storage 110 in the dedicated area of the CXL memory 120. That is, the write request REQ_WR may include address information about the map data MD and the dedicated area. Through operation PUP-S44 and operation PUP-S45, the map data MD present in the CXL storage 110 may be stored in the dedicated area of the CXL memory 120.

In operation PUP-S46, the CXL storage 110 may output acknowledge information ACK_md through the CXL storage interface circuit 111a. The CXL switch SW_CXL may transfer the acknowledge information ACK_md to the host 101. In response to the acknowledge information ACK_md, the host 101 may recognize that the CXL storage 110 stores the map data MD in the CXL memory 120. Afterwards, the host 101, the CXL storage 110, and the CXL memory 120 may perform a normal operation (e.g., a read operation or a write operation).

Also, operations of checking whether the sudden power-off (SPO) has occurred in the CXL storage 110 or the CXL memory 120 may be performed in operations of allocating a memory and the map data MD. For example, the host 101 may send requests for checking whether the sudden power-off (SPO) has occurred, to the CXL storage 110 and the CXL memory 120, respectively. In response to the requests, the CXL storage 110 and the CXL memory 120 may send, to the host 101, responses each providing notification that the sudden power-off (SPO) has occurred or has not occurred. The host 101 may perform the sudden power-off recovery (SPOR) operation based on the responses from the CXL storage 110 and the CXL memory 120. Through the sudden power-off recovery (SPOR) operation, the map data MD and the meta data stored in the nonvolatile memory NVM in the CXL storage 110 may be recovered in the CXL memory 120.

Figure 6:
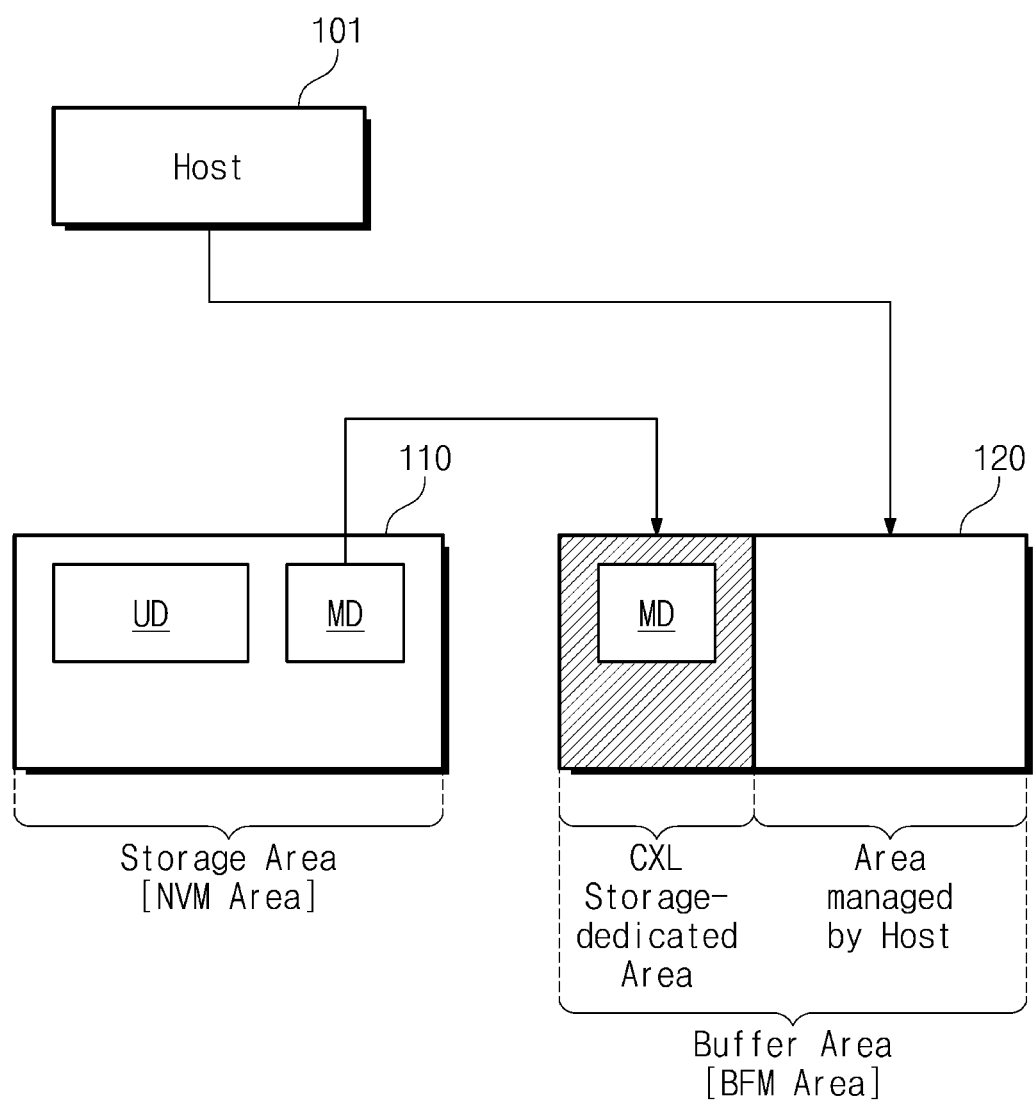
FIG. 6 is a diagram for describing an operation in which a computing system stores map data according to an embodiment.

FIG. 6 is a diagram for describing an operation in which a computing system stores map data. For convenience of description and for brevity of drawing, components of the host 101, the CXL storage 110, and the CXL memory 120 are conceptually illustrated, and some unnecessary components are omitted.

Referring to FIGS. 3 to 6, the host 101 may allocate a partial area of the CXL memory 120 for a dedicated area of the CXL storage 110. In this case, the dedicated area of the CXL memory 120 may be accessed by the CXL storage 110 and may be used to store map data of the CXL storage 110.

For example, as illustrated in FIG. 6, the nonvolatile memory NVM of the CXL storage 110 may store the user data UD and the map data MD. As described above, because the CXL storage 110 does not include a separate buffer memory, the CXL storage 110 may require a buffer area in which the map data MD are to be stored. According to an embodiment, the map data MD of the CXL storage 110 may be stored in a partial area (e.g., a dedicated area allocated by the host 101) of the buffer memory BFM in the CXL memory 120. In this case, the dedicated area of the CXL memory 120 may be accessed by the CXL storage 110 through the CXL switch SW_CXL.

In an embodiment, the remaining area of the CXL memory 120, which is not allocated, other than the dedicated area may be an area that is accessible by the host 101 or is managed by the host 101. In this case, the host 101 may access the remaining area of the buffer memory BFM in the CXL memory 120 through the CXL switch SW_CXL. In an embodiment, the remaining area of the CXL memory 120, which is not allocated for the dedicated area, may be used as a memory expander.

As described above, according to the request of the CXL storage 110, the host 101 may allocate at least a partial area of the CXL memory 120 for the dedicated area of the CXL storage 110. In this case, the CXL storage 110 may access a portion of the CXL memory 120, which is allocated for the dedicated area, and the host 101 may access the remaining area of the CXL memory 120 (i.e., the remaining area other than the dedicated area thus allocated). In an embodiment, both the access of the CXL storage 110 to the CXL memory 120 and the access of the host 101 to the CXL memory 120 may be performed through the same interface (e.g., a CXL interface or a CXL switch).

Figure 7:
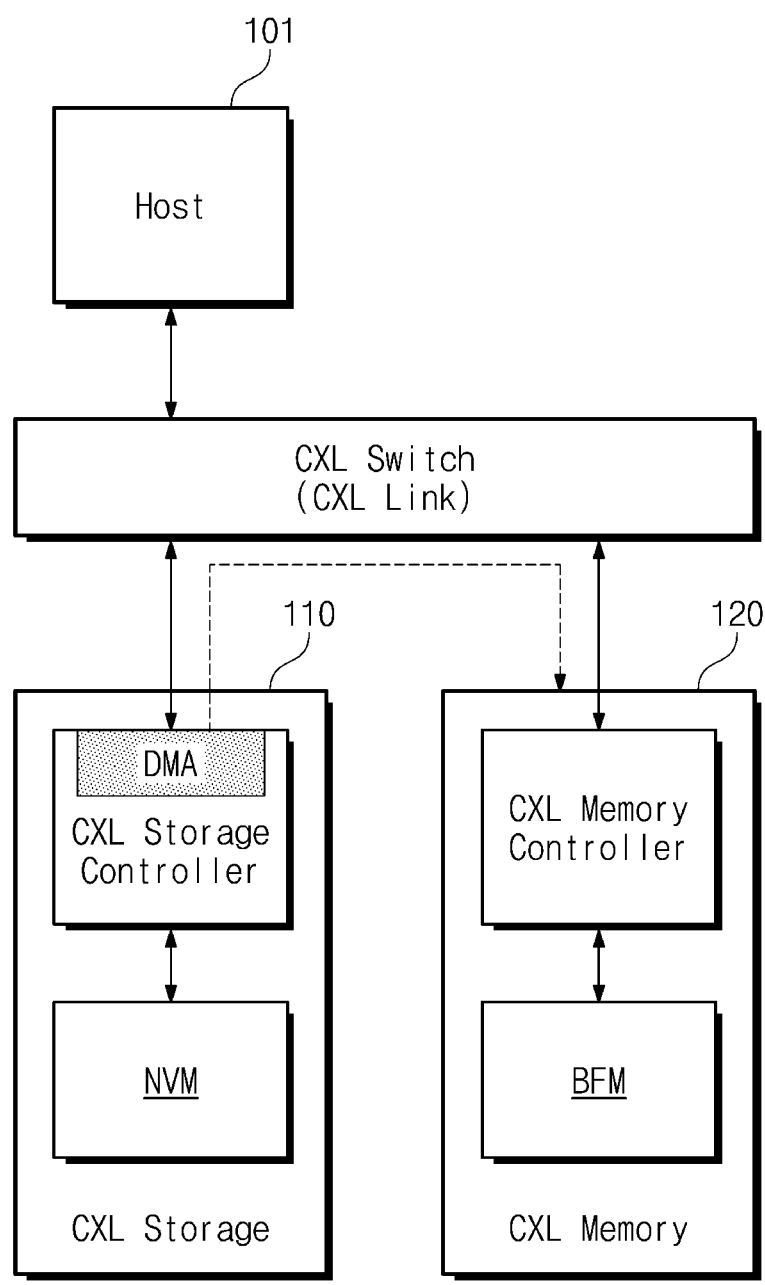
FIGS. 7 and 8 are diagrams for describing an operation in which map data are stored in a CXL memory according to an embodiment.
Figure 8:
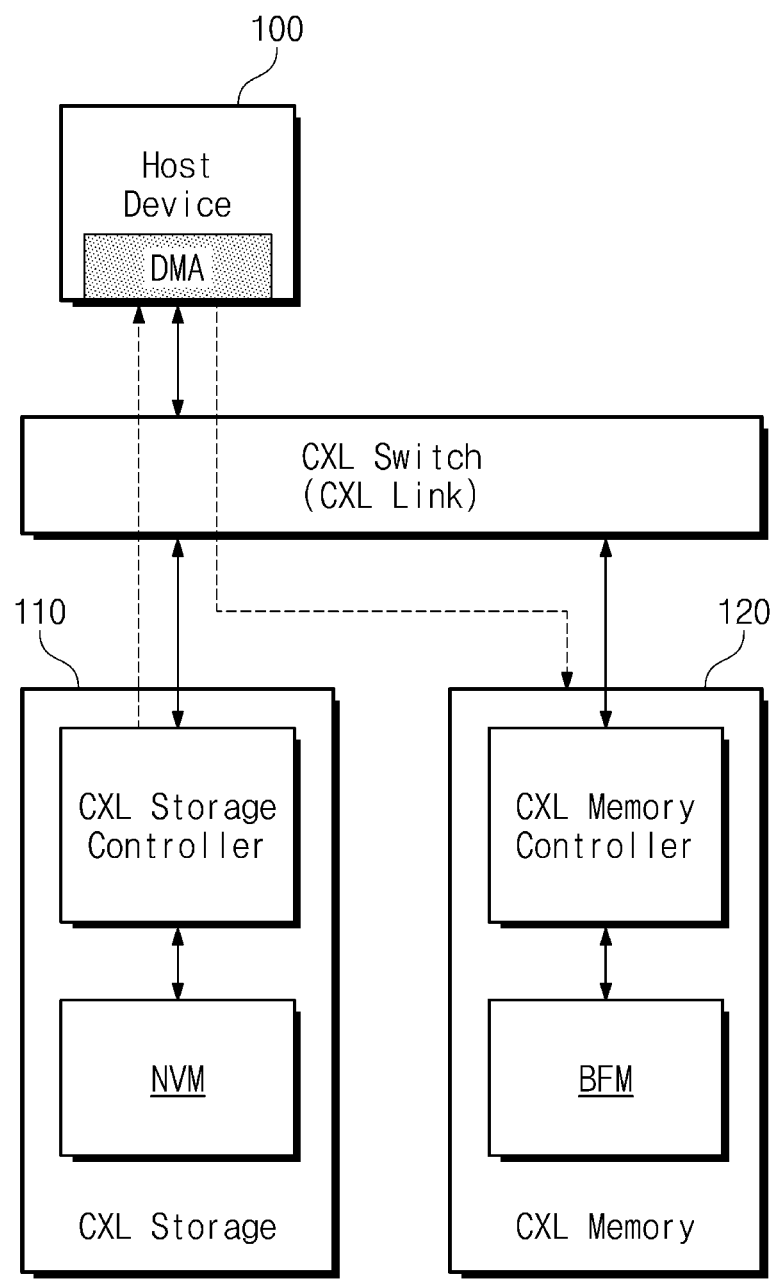

FIGS. 7 and 8 are diagrams for describing an operation in which map data are stored in a CXL memory. In an embodiment, the map data MD present in the CXL storage 110 may be transferred and stored to the CXL memory 120 from the CXL storage 110 through various manners.

As an example, the CXL storage 110 and the CXL memory 120 may exchange the map data MD based on a peer-to-peer (P2P) manner. For example, as illustrated in FIG. 7, the CXL storage controller 111 of the CXL storage 110 may include a direct memory access (DMA) engine. The DMA engine included in the CXL storage controller 111 may transfer the map data MD present in the nonvolatile memory NVM to the CXL memory 120 without the interference or control of the host 101. That is, the map data MD may be transferred from the CXL storage 110 to the CXL memory 120 based on the P2P manner.

As an example, under control of the host 101, the CXL storage 110 and the CXL memory 120 may exchange the map data MD based on the DMA manner. For example, as illustrated in FIG. 8, the host 101 may include a direct memory access (DMA) engine. The DMA engine of the host 101 may read the map data MD from the CXL storage 110 and may transfer the map data MD thus read to the CXL memory 120. In an embodiment, the DMA engine of the host 101 may read the map data MD from the CXL storage 110 based on the CXL.io and may transfer the map data MD to the CXL memory 120 based on the CXL.mem.

The above manners in which map data are transferred from the CXL storage 110 to the CXL memory 120 are provided as an example, and embodiments are not limited thereto. It may be understood that the transfer of map data from the CXL storage 110 to the CXL memory 120 is implemented in various manners using the CXL interface or the CXL switch. In an embodiment, the transfer (i.e., the backup or flush) of map data from the CXL memory 120 to the CXL storage 110 may also be implemented in a manner (s) similar to the above manners.

Figure 9:
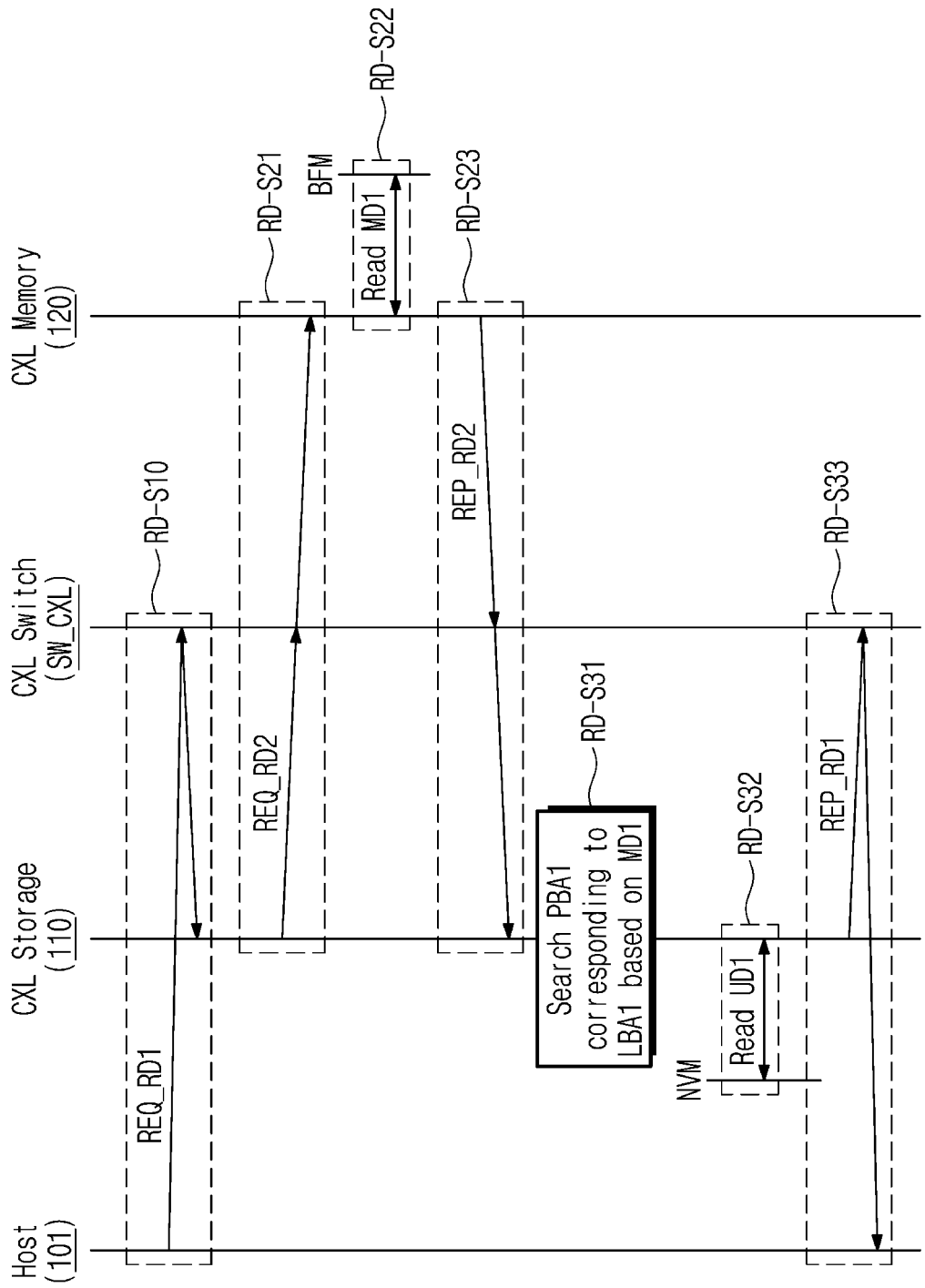
FIG. 9 is a flowchart illustrating a read operation for CXL storage of FIG. 2 according to an embodiment.

FIG. 9 is a flowchart illustrating a read operation for CXL storage of FIG. 2. In an embodiment, the read operation for the CXL storage 110 according to the flowchart of FIG. 9 may be performed after the initialization operation of FIG. 4 is performed (i.e., after the map data MD of the CXL storage 110 are stored in the dedicated area of the CXL memory 120).

Referring to FIGS. 2, 4, and 9, in operation RD-S10, the host 101 may output a first read request REQ_RD1 through the CXL host interface circuit 101a. The CXL switch SW_CXL may transfer the first read request REQ_RD1 to the CXL storage 110 targeted for the first read request REQ_RD1. In an embodiment, the first read request REQ_RD1 may refer to a request for reading first user data UD1 stored in the CXL storage 110 and may include a first logical block address LBA1 corresponding to the first user data UD1.

In operation RD-S21, the CXL storage 110 may output a second read request REQ_RD2 through the CXL storage interface circuit 111a in response to the first read request REQ_RD1. The CXL switch SW_CXL may transfer the second read request REQ_RD2 to the CXL memory 120. In an embodiment, the second read request REQ_RD2 may refer to a request for reading first map data MD1 corresponding to the first logical block address LBA1. That is, the second read request REQ_RD2 may refer to a request for reading the first map data MD1 from the CXL memory 120. The second read request REQ_RD2 may include information about a memory address (e.g., a logical address or a virtual address) of the CXL memory 120, which indicates an area where the first map data MD1 are stored.

In operation RD-S22, the CXL memory 120 may read the first map data MD1 in response to the second read request REQ_RD2. For example, the CXL memory controller 121 of the CXL memory 120 may read the first map data MD1 from an area corresponding to a memory address (e.g., a logical address or a virtual address) included in the second read request REQ_RD2. In an embodiment, the CXL memory controller 121 may read the first map data MD1 from the buffer memory BFM by using the buffer memory interface circuit 121g.

In an embodiment, the first map data MD1 read in operation RD-S22 may be a portion of the entire map data MD and may be map data corresponding to the first logical block address LBA1. That is, the first map data MD1 may include information about a first physical block address PBA1 corresponding to the first logical block address LBA1.

In operation RD-S23, the CXL memory 120 may output a second read response REP_RD2 including the first map data MD1 through the CXL memory interface circuit 121a. The CXL switch SW_CXL may transfer the second read response REP_RD2 to the CXL storage 110. In an embodiment, the first map data MD1 included in the second read response REP_RD2 received through the CXL switch SW_CXL may be stored or temporarily stored in the input/output buffer 111c of the CXL storage controller 111.

In an embodiment, when the first map data MD1 corresponding to the first logical block address LBA1 is already present in the input/output buffer 111c of the CXL storage controller 111, operation RD-S21 to operation RD-S23 (i.e., operations for loading the first map data MD1 from the CXL memory 120) may be omitted.

In operation RD-S31, the CXL storage 110 may search for the first physical block address PBA1 corresponding the first logical block address LBA1 based on the first map data MD1. For example, the FTL 111d of the CXL storage controller 111 may search for the first physical block address PBA1 corresponding to the first logical block address LBA1 based on the first map data MD1.

In operation RD-S32, the CXL storage 110 may read the first user data UD1 present in an area corresponding to the first physical block address PBA1 from the nonvolatile memory NVM. For example, the CXL storage controller 111 may read the first user data UD1 from the area of the nonvolatile memory NVM, which corresponds to the first physical block address PBA1. In an embodiment, the CXL storage controller 111 may read the first user data UD1 from the nonvolatile memory NVM by using the NAND interface circuit 111f.

In operation RD-S33, the CXL storage 110 may output a first read response REP_RD1 to the first read request REQ_RD1 through the CXL storage interface circuit 111a. The CXL switch SW_CXL may transfer the first read response REP_RD1 to the host 101. In an embodiment, the first read response REP_RD1 may include the first user data UD1 requested through the first read request REQ_RD1. The host 101 may obtain the first user data UD1 through the first read response REP_RD1.

In an embodiment, operation RD-S10 and operation RD-S33 corresponding to the communications between the host 101 and the CXL storage 110 may be performed based on the CXL.io, and operation RD-S21 to operation RD-S23 corresponding to the communications between the CXL storage 110 and the CXL memory 120 may be performed based on the CXL.mem. However, embodiments are not limited thereto. For example, the communications between the host 101, the CXL storage 110, and the CXL memory 120 may be performed through the CXL switch SW_CXL (i.e., a common interface, a common link, or a common switch).

Figure 10:
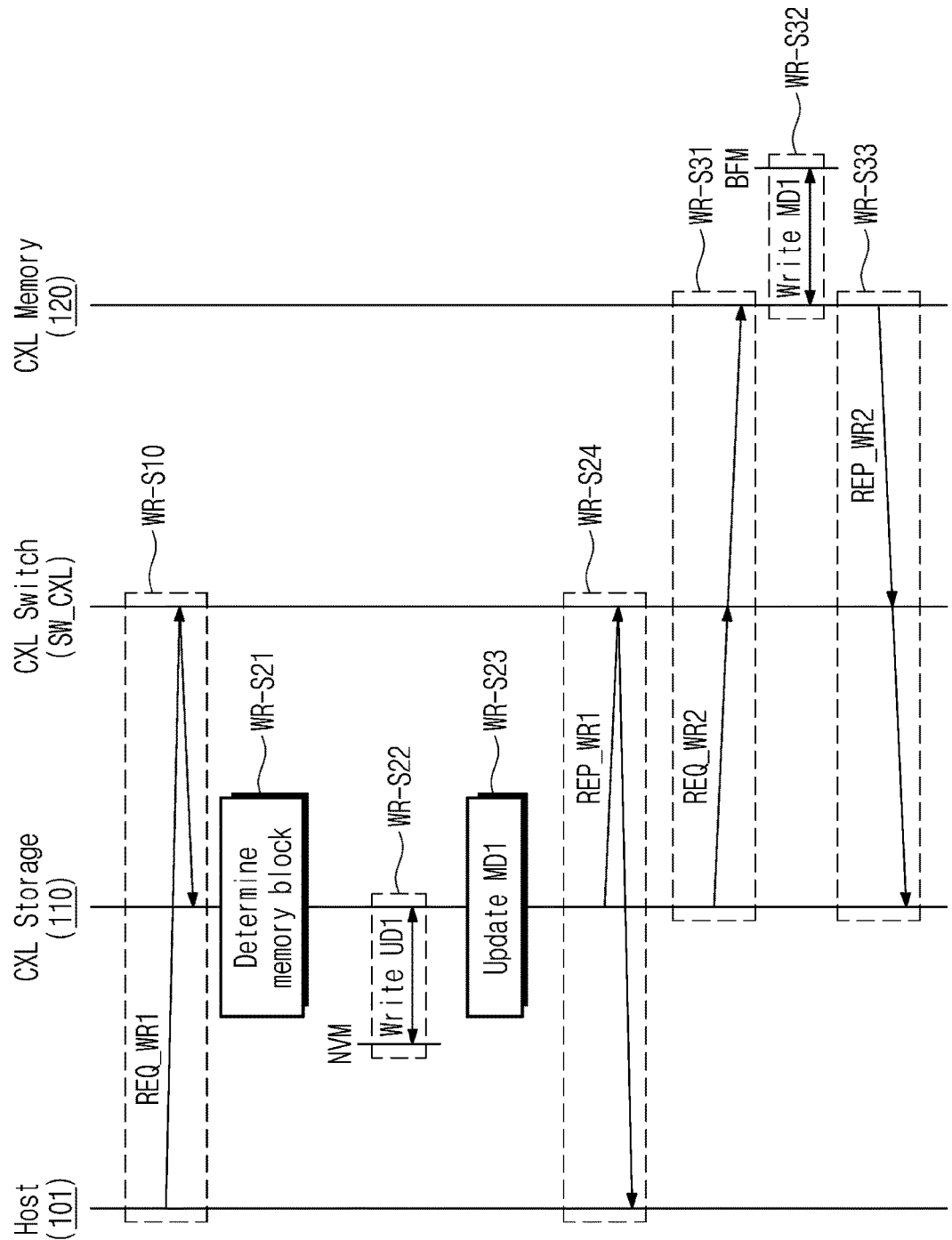
FIG. 10 is a flowchart illustrating a write operation for CXL storage of FIG. 2 according to an embodiment.

FIG. 10 is a flowchart illustrating a write operation for CXL storage of FIG. 2. In an embodiment, the write operation for the CXL storage 110 according to the flowchart of FIG. 10 may be performed after the initialization operation of FIG. 5 is performed (i.e., after the map data MD of the CXL storage 110 are stored in the dedicated area of the CXL memory 120).

Referring to FIGS. 2, 4, and 10, in operation WR-S10, the host 101 may output a first write request REQ_WR1 through the CXL host interface circuit 101a. The CXL switch SW_CXL may transfer the first write request REQ_WR1 to the CXL storage 110. In an embodiment, the first write request REQ_WR1 may refer to a request for writing the first user data UD1 in the CXL storage 110.

In operation WR-S21, the CXL storage 110 may determine a memory block in which the first user data UD1 are to be written, in response to the first write request REQ_WR1. For example, the FTL 111d of the CXL storage controller 111 may manage block information about a memory block, which is free, capable of being written to, or capable of being allocated, from among memory blocks included in the nonvolatile memory NVM. The FTL 111d may select a memory block, in which the first user data UD1 are to be written, based on the block information.

In operation WR-S22, the CXL storage 110 may write the first user data UD1 in the selected memory block. For example, the CXL storage controller 111 may control the nonvolatile memory NVM such that the first user data UD1 are written in the selected memory block. In an embodiment, the CXL storage controller 111 may write the first user data UD1 in the nonvolatile memory NVM by using the NAND interface circuit 111f.

When the first user data UD1 are completely written in the nonvolatile memory NVM (i.e., when a program operation for the nonvolatile memory NVM is completed), in operation WR-S23, the CXL storage 110 may update the first map data MD1 or may generate the first map data MD1. For example, the first map data MD1 may include information indicating that the first user data UD1 corresponding to the first logical block address LBA1 are stored in an area of the nonvolatile memory NVM, which corresponds to the first physical block address PBA1. That is, the CXL storage 110 may generate the first map data MD1 indicating that the first user data UD1 corresponding to the first logical block address LBA1 are stored in the area corresponding to the first physical block address PBA1.

In operation WR-S24, the CXL storage 110 may output a first write response REP_WR1 to the first write request REQ_WR1 through the CXL storage interface circuit 111a. The CXL switch SW_CXL may transfer the first write response REP_WR1 to the host 101. In response to the first write response REP_WR1, the host 101 may determine that the first user data UD1 corresponding to the first write request REQ_WR1 are normally stored in the CXL storage 110.

After the write operation for the CXL storage 110 requested by the host 101 is completed, the CXL storage 110 may perform a map data update operation. For example, in operation WR-S31, the CXL storage 110 may output a second write request REQ_WR2 through the CXL storage interface circuit 111a. The CXL switch SW_CXL may transfer the second write request REQ_WR2 to the CXL memory 120.

In an embodiment, the second write request REQ_WR2 may refer to a request for writing the first map data MD1, which are updated or generated as the first user data UD1 are stored, in the CXL memory 120. The second write request REQ_WR2 may include a memory address at which the first map data MD1 are to be stored. The memory address included in the second write request REQ_WR2 may indicate the area of the CXL memory 120, which is dedicated for the CXL storage 110.

In operation WR-S32, the CXL memory 120 may store the first map data MD1 in the corresponding area in response to the second write request REQ_WR2. For example, the CXL memory 120 may write the first map data MD1 in the area corresponding to the memory address included in the second write request REQ_WR2.

In operation WR-S33, the CXL memory 120 may output a second write response REP_WR2 to the second write request REQ_WR2 through the CXL memory interface circuit 121a. The CXL switch SW_CXL may transfer the second write response REP_WR2 to the CXL storage 110.

In an embodiment, operation WR-S31 to operation WR-S33 (i.e., an operation of storing map data in the CXL memory 120 or an operation of updating map data) may be performed whenever the write operation for the CXL storage 110 is completed. Alternatively, operation WR-S31 to operation WR-S33 may be performed when the size of map data updated or newly generated reaches a given value. Alternatively, operation WR-S31 to operation WR-S33 may be performed periodically. However, embodiments are not limited thereto. For example, map data that are generated or updated during the operation of the CXL storage 110 may be stored in the CXL memory 120 according to various operation policies.

Figure 11:
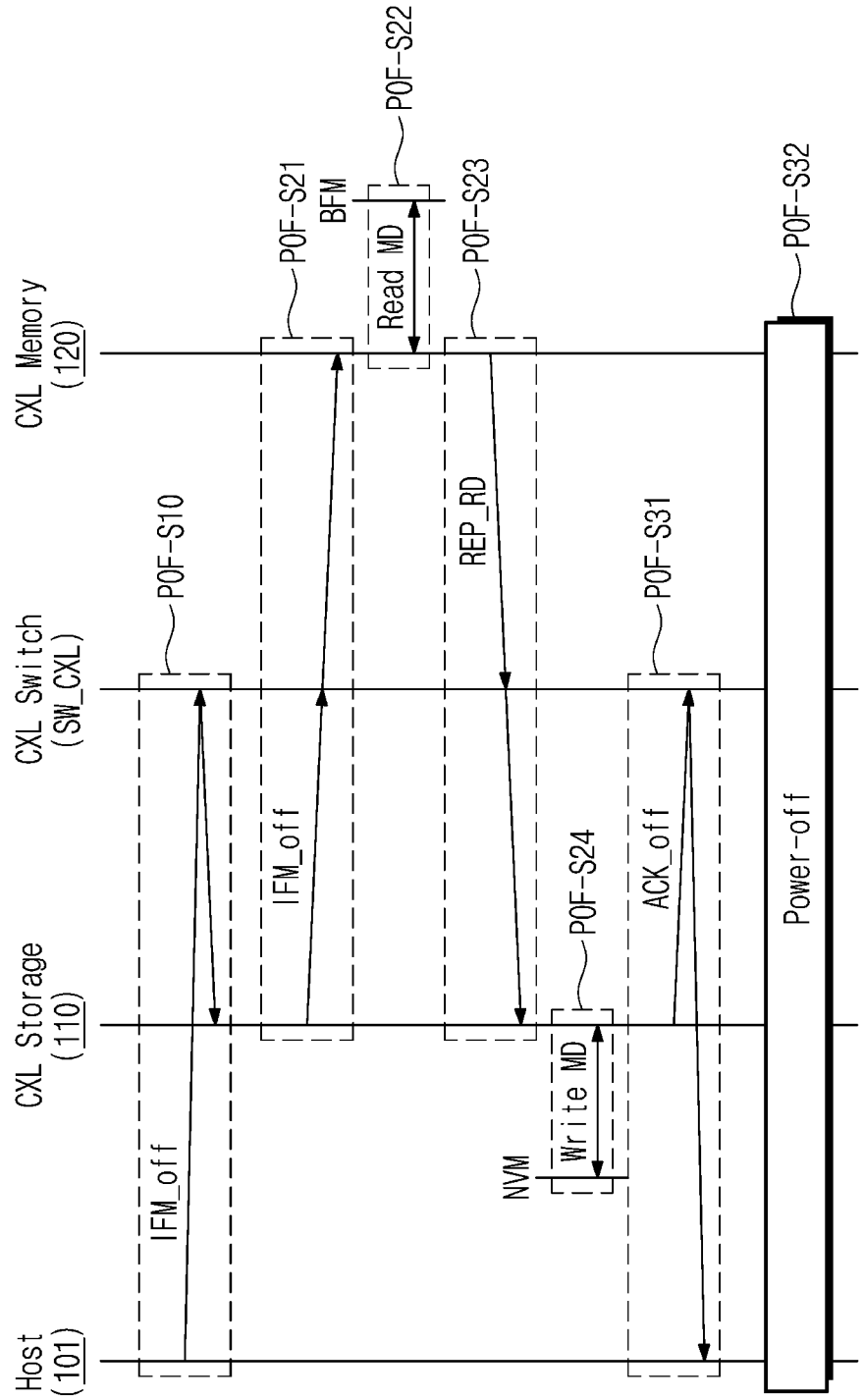
FIG. 11 is a flowchart illustrating a power-off operation of a computing system of FIG. 2 according to an embodiment.

FIG. 11 is a flowchart illustrating a power-off operation of a computing system of FIG. 2. In an embodiment, a power-off operation of a computing system will be described with reference to FIG. 11, but embodiments are not limited thereto. For example, it may be understood that the operating method of FIG. 11 is applicable to the power-off operation or reset operation of each of various components (e.g., a host, CXL storage, a CXL memory, and a CXL switch) included in the computing system.

Referring to FIGS. 2 and 11, in operation POF-S10, the host 101 may output power-off information IFM_off through the CXL host interface 101a. The CXL switch SW_CXL may transfer the power-off information IFM_off to the CXL storage 110. For example, the host 101 may recognize or detect information about power-off of the computing system 100. The host 101 may send the power-off information IFM_off to the CXL storage 110 through the CXL switch SW_CXL such that the CXL storage 110 performs a power-off operation.

In operation POF-S21, the CXL storage 110 may output a read request REQ_RD through the CXL storage interface circuit 111a in response to the power-off information IFM_off. The CXL switch SW_CXL may transfer the read request REQ_RD to the CXL memory 120. In an embodiment, the read request REQ_RD in operation POF-S21 may refer to a request for reading the entire map data MD stored in the CXL memory 120. The read request REQ_RD may include a memory address of an area where the map data MD are stored.

In operation POF-S22, the CXL memory 120 may read the map data MD in response to the read request REQ_RD. For example, the CXL memory 120 may read the map data MD from the buffer memory BFM based on the memory address included in the read request REQ_RD.

In operation POF-S23, the CXL memory 120 may output a read response REP_RD to the read request REQ_RD through the CXL memory interface circuit 121a. The CXL switch SW_CXL may transfer the read response REP_RD to the CXL storage 110.

In operation POF-S24, the CXL storage 110 may write the map data MD included in the read response REP_RD in the nonvolatile memory NVM. In an embodiment, the CXL storage 110 may store the map data MD of a given area of the nonvolatile memory NVM.

After the entire map data MD associated with the CXL storage 110 are stored in the nonvolatile memory NVM, in operation POF-S31, the CXL storage 110 may output a response ACK_off to the power-off information IFM_off. The CXL switch SW_CXL may send the response ACK_off to the host 101. The host 101 may recognize that the map data MD present in the CXL memory 120 are normally stored in the CXL storage 110, based on the response ACK_off.

Afterwards, in operation POF-S32, the host 101, the CXL storage 110, the CXL memory 120, and the CXL switch SW_CXL may be powered off. For example, a power that is provided to the host 100, the CXL storage 110, the CXL memory 120, and the CXL switch SW_CXL may be interrupted.

The power-off operation described with reference to FIG. 11 is provided as an example, and embodiments are not limited thereto. For example, in some embodiments, after the CXL storage 110 stores the map data MD present in the CXL memory 120 in the nonvolatile memory NVM, the CXL storage 110 may provide notification that the map data MD are completely backed up, by sending the acknowledge ACK_off to the host 101 (i.e., an interrupt manner). Alternatively, the, CXL storage 110 may store the map data MD present in the CXL memory 120 in the nonvolatile memory NVM and may then set a value of a specific register to a given value. The host 101 may determine whether the map data MD are completely backed up, by periodically checking the value of the specific register of the CXL storage 110 (i.e., a polling manner). Alternatively, the CXL storage 110 may be configured to complete the backup operation for the map data MD within a given time from a point in time when the power-off information IFM_off is received from the host 101 (i.e., a time-out manner). As described above, the CXL storage 110 may transfer information about backup completion of the map data MD to the host 101 through at least one of various manners.

In an embodiment, the power-off operation may be changed according to an operation manner of the CXL storage 110. For example, when the CXL storage 110 performs the write operation, the CXL storage 110 may perform the program operation on the nonvolatile memory NVM and thus may update the map data MD.

In an embodiment, the operation of updating the map data MD may be performed only on the CXL memory 120. In this case, the map data MD stored in the CXL memory 120 may be up-to-date information, and the map data MD stored in the nonvolatile memory NVM may not be up-to-date information. That is, when the operation of updating the map data MD is performed only on the CXL memory 120, up-to-date information about the map data MD is maintained only in the CXL memory 120; for this reason, when the CXL storage 110, the CXL memory 120, or the computing system 100 is powered off, an operation of flushing, backing up, or dumping the map data MD from the CXL memory 120 is required. In an embodiment, the map data (MD) update operation may be first performed with respect to the map data MD stored in the nonvolatile memory NVM and may then be performed with respect to the map data MD stored in the CXL memory 120 through the background operation. In this case, because the map data MD stored in the nonvolatile memory NVM are guaranteed to be up-to-date information, the operation of flushing, dumping, or backing up the map data MD from the CXL memory 120 may not be required when the CXL storage 110, the CXL memory 120, or the computing system 100 is powered off.

In an embodiment, the map data update operation may be first performed with respect to the map data MD stored in the CXL memory 120 and may then be performed with respect to the map data MD stored in the nonvolatile memory NVM through the background operation. In this case, the map data MD stored in the CXL memory 120 may be up-to-date information, and the map data MD stored in the nonvolatile memory NVM may not be up-to-date information. As such, when the CXL storage 110, the CXL memory 120, or the computing system 100 is powered off, at least a portion of the map data MD of the CXL memory 120 has to be backed up to the nonvolatile memory NVM of the CXL storage 110. In an embodiment, at least a portion of the map data MD to be backed up to the nonvolatile memory NVM may be the up-to-date map data MD that are not stored in the nonvolatile memory NVM. In an embodiment, the CXL storage 110 may manage or store flag information or table information indicating that the map data MD stored in the nonvolatile memory NVM are up-to-date information.

As described above, when the CXL storage 110, the CXL memory 120, or the computing system 100 is powered off, according to a way to manage the map data MD (i.e., according to a place where up-to-date information is managed), the map data MD may be selectively flushed, backed up, or dumped to the CXL storage 110 from the CXL memory 120.

Figure 12:
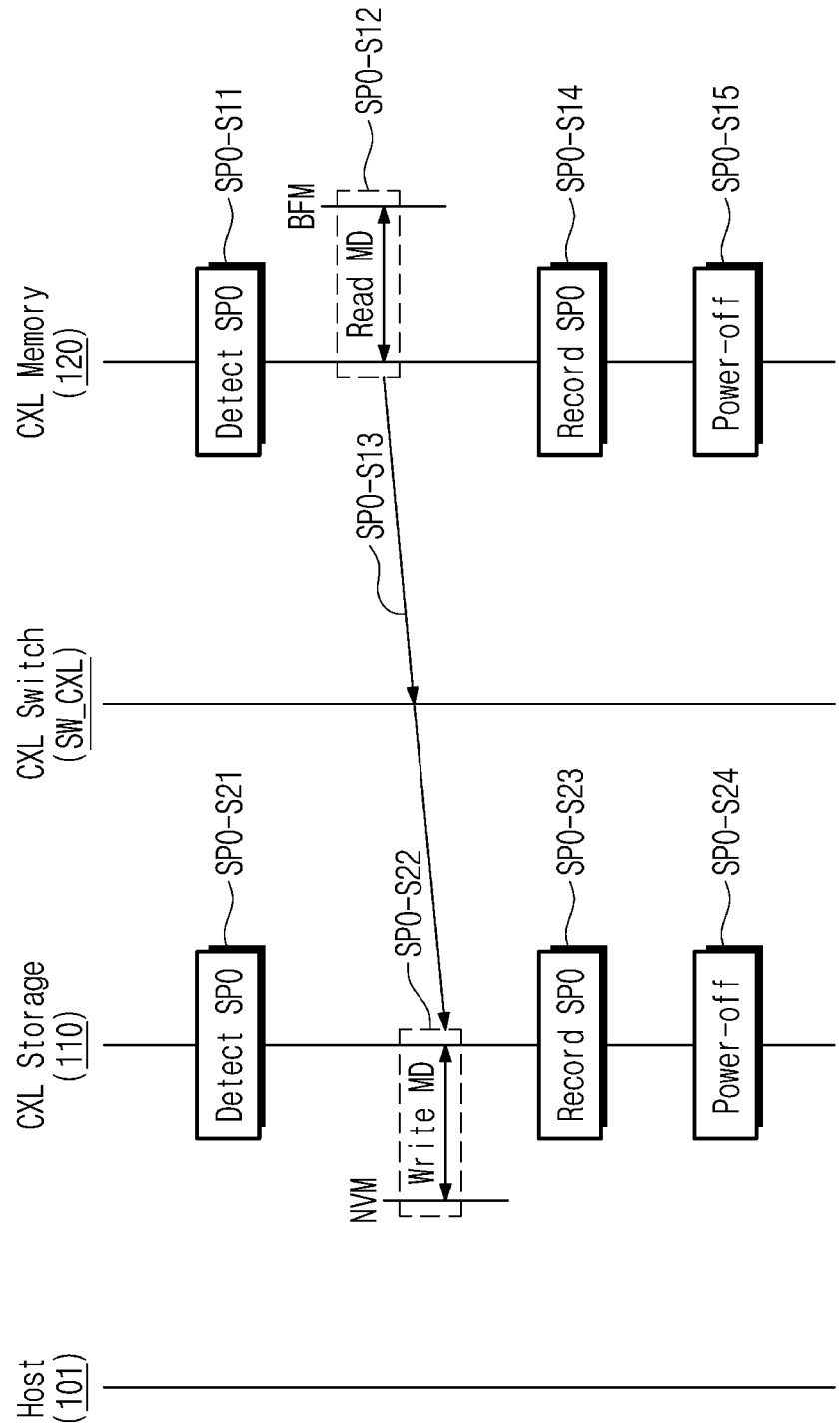
FIG. 12 is a flowchart illustrating a sudden power-off (SPO) operation of a computing system of FIG. 2 according to an embodiment.

FIG. 12 is a flowchart illustrating a sudden power-off (SPO) operation of a computing system of FIG. 2.

Referring to FIGS. 2 to 4, and 12, in operation SPO-S11, the CXL memory 120 may detect the sudden power-off (SPO) (or the sudden power-off (SPO) event). For example, in response to a power supply voltage supplied through a power rail decreasing or in response to a signal transferred through the CXL switch SW_CXL, the CXL memory 120 may detect the sudden power-off (SPO) event. When the sudden power-off (SPO) event is detected, the CXL memory controller 121 may control the power supply of the power storage PS2, and the CXL memory 120 may be supplied with the power from the power storage PS2.

Additionally/alternatively, in operation SPO-521, the CXL storage 110 may detect the sudden power-off (SPO) event. For example, in response to a power supply voltage supplied through a power rail decreasing or in response to a signal transferred through the CXL switch SW_CXL, the CXL storage 110 may detect the sudden power-off (SPO) event. When the sudden power-off (SPO) event is detected, the CXL storage controller 111 may control the power supply of the power storage PS3, and the CXL storage 110 may be supplied with the power from the power storage PS3.

In operation SPO-S12, the CXL memory 120 may read the map data MD and the meta data stored in the buffer memory BFM, and the map data MD and the meta data thus read may be temporarily stored in the meta data buffer 121*e*. The CXL memory controller 121 may send the read map data MD and the read meta data to the CXL storage 110 (SPO-S13), and the CXL storage 110 may write the map data MD in the nonvolatile memory NVM (SPO-S22).

Afterwards, in operation SPO-S14, the CXL memory 120 may record information of the CXL storage 110 backed up due to the sudden power-off (SPO) event. For example, the CXL memory 120 may record information indicating the occurrence of the sudden power-off (SPO) at one of various storage elements such as a nonvolatile storage element, an electrical fuse, and a mask ROM. In operation SPO-S15, the CXL memory 120 may be powered off.

In operation SPO-523, the CXL storage 110 may record information indicating the occurrence of the sudden power-off (SPO). For example, the CXL storage 110 may record information indicating the occurrence of the sudden power-off (SPO) at one of various storage elements such as a nonvolatile storage element, an electrical fuse, and a mask ROM. Afterwards, in operation SPO-524, the CXL storage 110 may be powered off.

Because the computing system 100 of FIG. 4 includes only one CXL storage 110, there is little room for the utilization of the meta data copy, division storage scheme described with reference to FIG. 3. How to back up the map data MD and the meta data when the sudden power-off (SPO) event occurs in a computing device including a plurality of CXL storages will be described with reference to FIG. 15.

Figure 13:
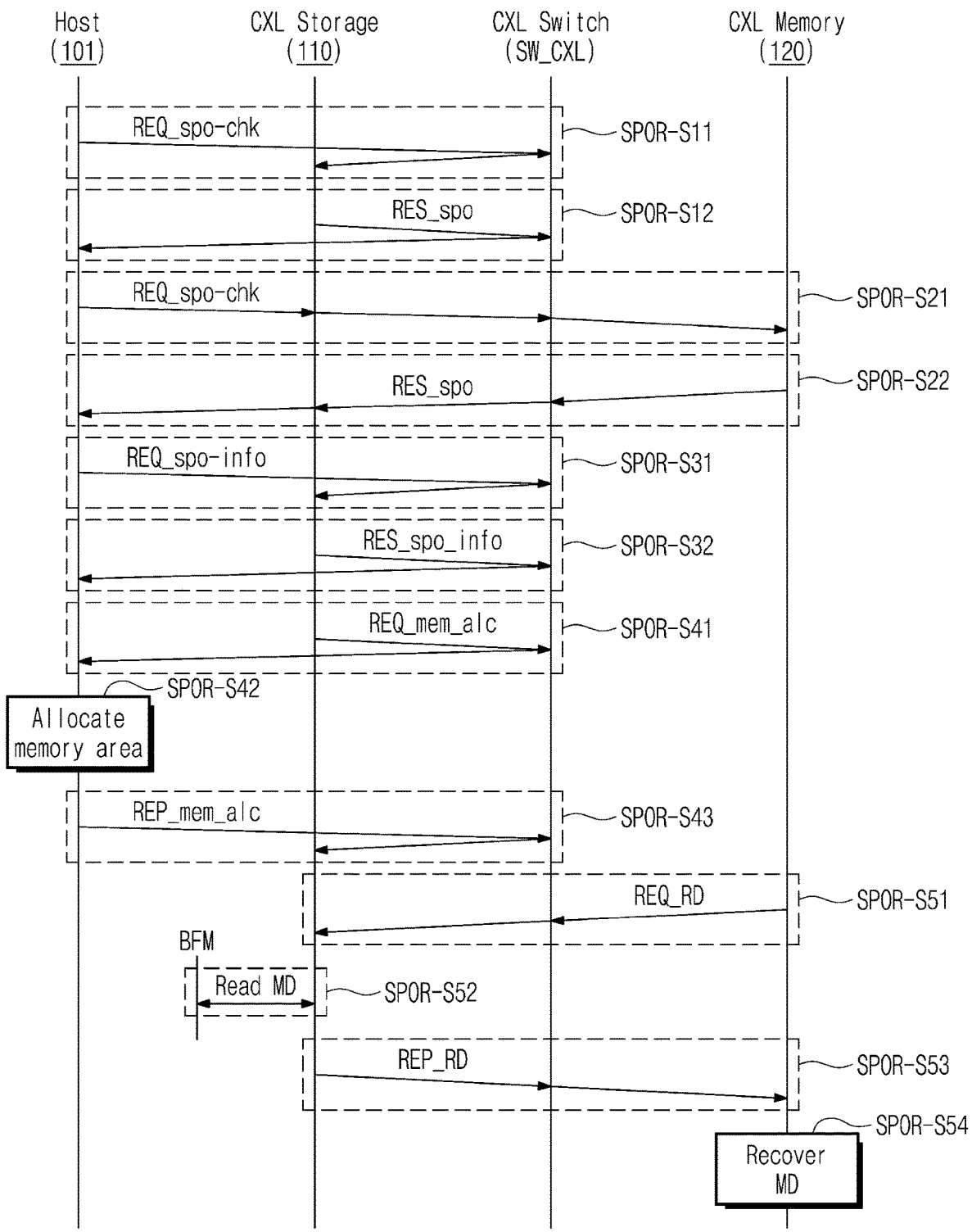
FIG. 13 is a flowchart illustrating a SPOR operation of a computing system of FIG. 2 according to an embodiment.

FIG. 13 is a flowchart illustrating a sudden power-off recovery (SPOR) operation of a computing system of FIG. 2.

Referring to FIGS. 2 to 4 and 13, the host 101 may send, to the CXL storage 110, a request REQ_spo_chk for checking whether the sudden power-off (SPO) event has occurred (SPOR-S11). The CXL storage 110 may send, to the host 101, a response REP_spo providing notification that the sudden power-off (SPO) event has occurred (SPOR-S12). The host 101 may identify that the CXL storage 110 has experienced the sudden power-off (SPO), based on the response REP_spo.

The host 101 may send, to the CXL memory 120, the request REQ_spo_chk for checking whether the sudden power-off (SPO) event has occurred (SPOR-S21). The CXL memory 120 may send, to the host 101, the response REP_spo providing notification that the sudden power-off (SPO) event has occurred (SPOR-S22). The host 101 may identify that the CXL memory 120 has experienced the sudden power-off (SPO), based on the response REP_spo.

As the sudden power-off recovery (SPOR) operation is performed, the recovery of the map data MD may be performed. The host 101 may send, to the CXL storage 110, a request REQ_spo_info for requiring information about the map data MD and the meta data stored in the CXL storage 110. The CXL storage 110 may send, to the host 101, a response REP_spo_info including the information about the map data MD and the meta data stored in the nonvolatile memory device NVM (SPOR-S32).

While or after the host 101 obtains the information about the map data MD requiring recovery, the CXL storage 110 may output the memory allocation request REQ_mem_alc through the CXL storage interface circuit 111*a* (SPOR-S41). The memory allocation request REQ_mem_alc may be transferred to the host 101 through the CXL switch SW_CXL. The host 101 may allocate at least a partial area of the CXL memory 120 for a dedicated area of the CXL storage 110 in response to the memory allocation request REQ_mem_alc (SPOR-S42). The host 101 may output the memory allocation response REP_mem_alc through the CXL host interface circuit 101*a*. The memory allocation response REP_mem_alc may be transferred to the CXL storage 110 through the CXL switch SW_CXL (SPOR-S43). The memory allocation response REP_mem_alc may include the following: a device identifier of the CXL memory 120 and a memory address (e.g., a logical address range or a virtual address range) of an area of the CXL memory 120, which is allocated for the dedicated area of the CXL storage 110.

In operation SPOR-S51, the CXL memory 120 may retrieve the meta data stored in the CXL storage 110, and may send the request REQ_RD for the map data MD to be recovered to the CXL storage 110 through the CXL switch SW_CXL according to the found meta data. In operation SPOR-S52, the CXL storage 110 may read the map data MD from the nonvolatile memory NVM in response to the request REQ_RD.

In operation SPOR-S53, the CXL storage 110 may send the response REP_RD including the map data MD to the CXL memory 120 through the CXL switch SW_CXL.

In operation SPOR-S54, based on the response REP_RD received from the CXL storage 110, the CXL memory 120 may recover the map data MD for the CXL storage 110 so as to be up-to-date.

Figure 14:
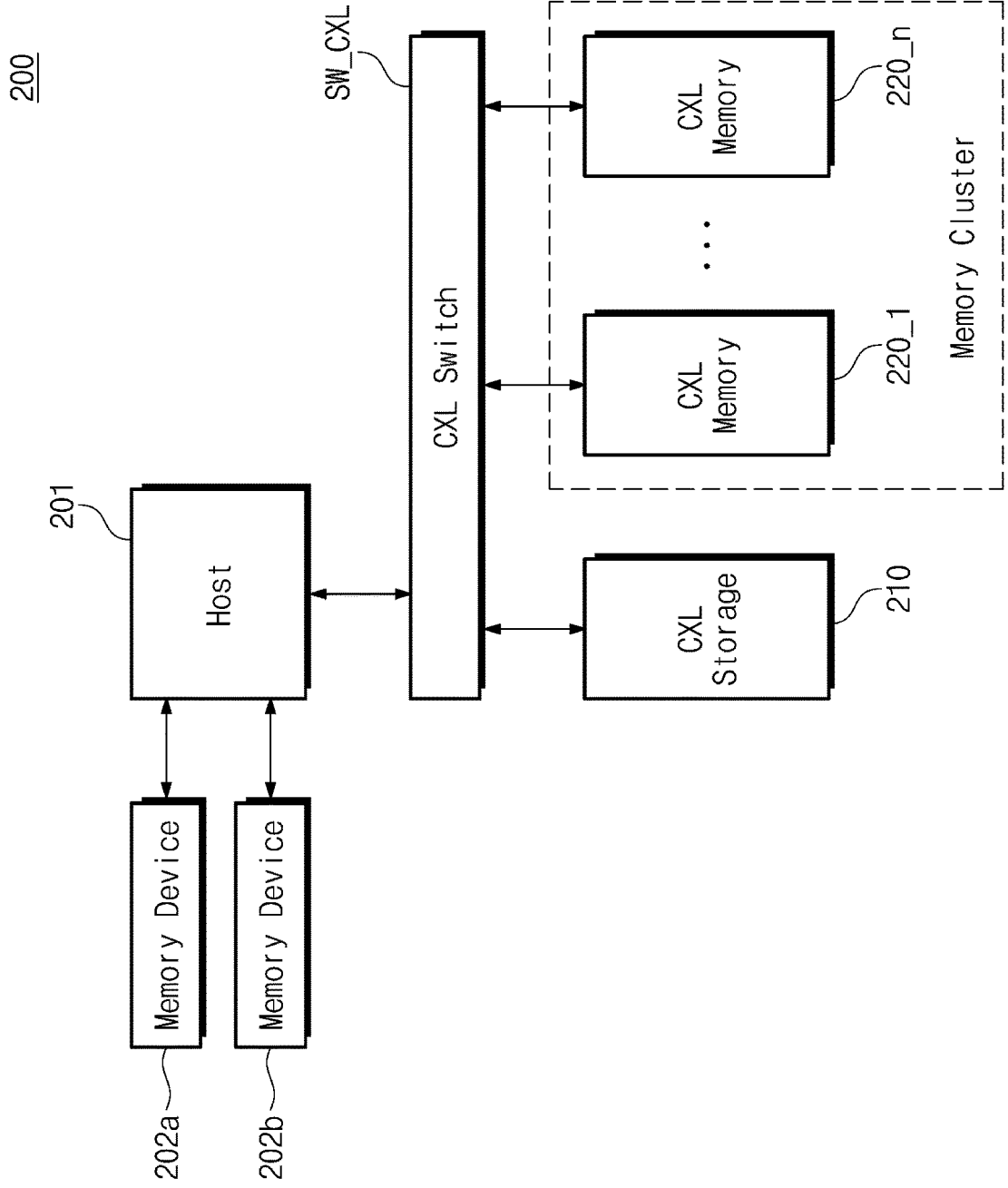
FIG. 14 is a block diagram illustrating a computing system according to an embodiment.

FIG. 14 is a block diagram illustrating a computing system according to an embodiment. Below, for convenience of description, additional description associated with the components described above will be omitted to avoid redundancy. Referring to FIG. 14, a computing system 200 may include a host 201, a plurality of memory devices 202*a* and 202*b*, the CXL switch SW_CXL, CXL storage 210, and a plurality of CXL memories 220_1 to **220_*n***.

The host 201 may be directly connected with the plurality of memory devices 202*a* and 202*b*. The host 201, the CXL storage 210, and the plurality of CXL memories 220_1 to 220_n may be connected with the CXL switch SW_CXL and may communicate with each other through the CXL switch SW_CXL.

In an embodiment, the CXL storage 210 may have a structure similar to that of the CXL storage 110 described with reference to FIGS. 2 to 10, and each of the plurality of CXL memories 220_1 to 220_n may have a structure similar to that of the CXL memory 120 described with reference to FIGS. 2 to 10. That is, each of the plurality of CXL memories 220_1 to 220_n may be implemented with an individual memory device or memory module and may be connected with the CXL switch SW_CXL through different physical ports. That is, as the plurality of CXL memories 220_1 to 220_n are connected with the CXL switch SW_CXL, a memory area (or capacity) that is managed by the host 201 may increase.

In an embodiment, the host 201 may manage the plurality of CXL memories 220_1 to 220_n as one memory cluster. In an embodiment, the host 201 may allocate at least some of the plurality of CXL memories 220_1 to 220_n for a memory dedicated for the CXL storage 210. Alternatively, the host 201 may allocate at least a partial area of each of the plurality of CXL memories 220_1 to 220_n for a memory dedicated for the CXL storage 210.

Figure 15:
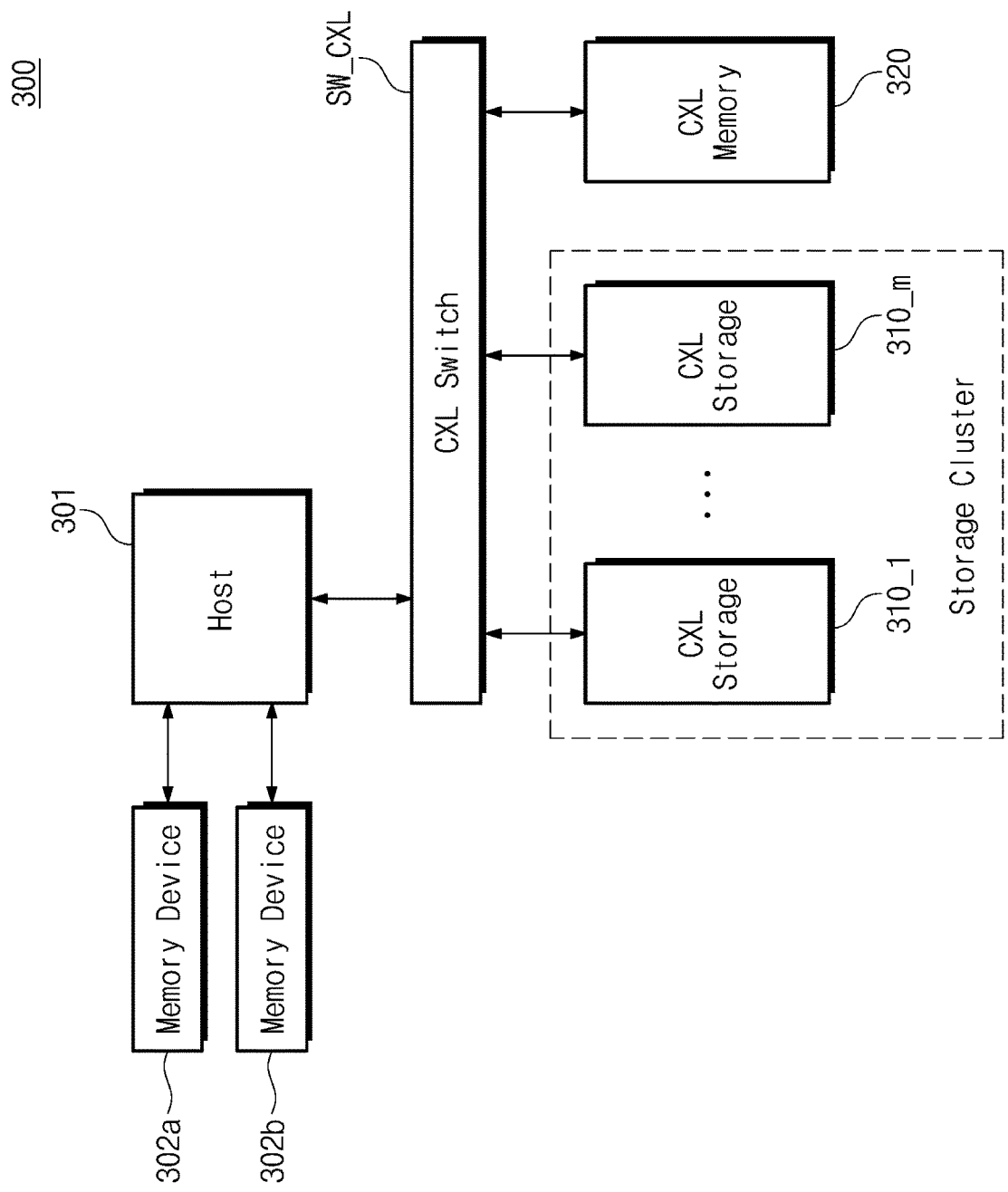
FIG. 15 is a block diagram illustrating a computing system according to an embodiment.

FIG. 15 is a block diagram illustrating a computing system according to an embodiment. Below, for convenience of description, additional description associated with the components described above will be omitted to avoid redundancy. Referring to FIG. 15, a computing system 300 may include a host 301, a plurality of memory devices 302a and 302b, the CXL switch SW_CXL, a plurality of CXL storages 310_1 to 310_m, and a CXL memory 320.

The host 301 may be directly connected with the plurality of memory devices 302a and 302b. The host 301, the plurality of CXL storages 310_1 to 310_m, and the CXL memory 320 may be connected with the CXL switch SW_CXL and may communicate with each other through the CXL switch SW_CXL.

In an embodiment, each of the plurality of CXL storages 310_1 to 310_m may have a structure similar to that of the CXL storage 110 described with reference to FIGS. 2 to 10, and the CXL memory 320 may have a structure similar to that of the CXL memory 120 described with reference to FIGS. 2 to 10. That is, each of the plurality of CXL storages 310_1 to 310_m may be implemented with an individual storage device or storage module and may be connected with the CXL switch SW_CXL through different physical ports. That is, as the plurality of CXL storages 310_1 to 310_m are connected with the CXL switch SW_CXL, a storage area (or capacity) that is available by the host 301 may increase.

In an embodiment, at least a partial area of the CXL memory 320 may be allocated for an area dedicated for the plurality of CXL storages 310_1 to 310_m. For example, the host 301 may manage the plurality of CXL storages 310_1 to 310_m as one storage cluster and may allocate a partial area of the CXL memory 320 for a dedicated area of one storage cluster. Alternatively, the host 301 may allocate partial areas of the CXL memory 320 for dedicated areas of the respective CXL storages 310_1 to 310_m.

Figure 16:
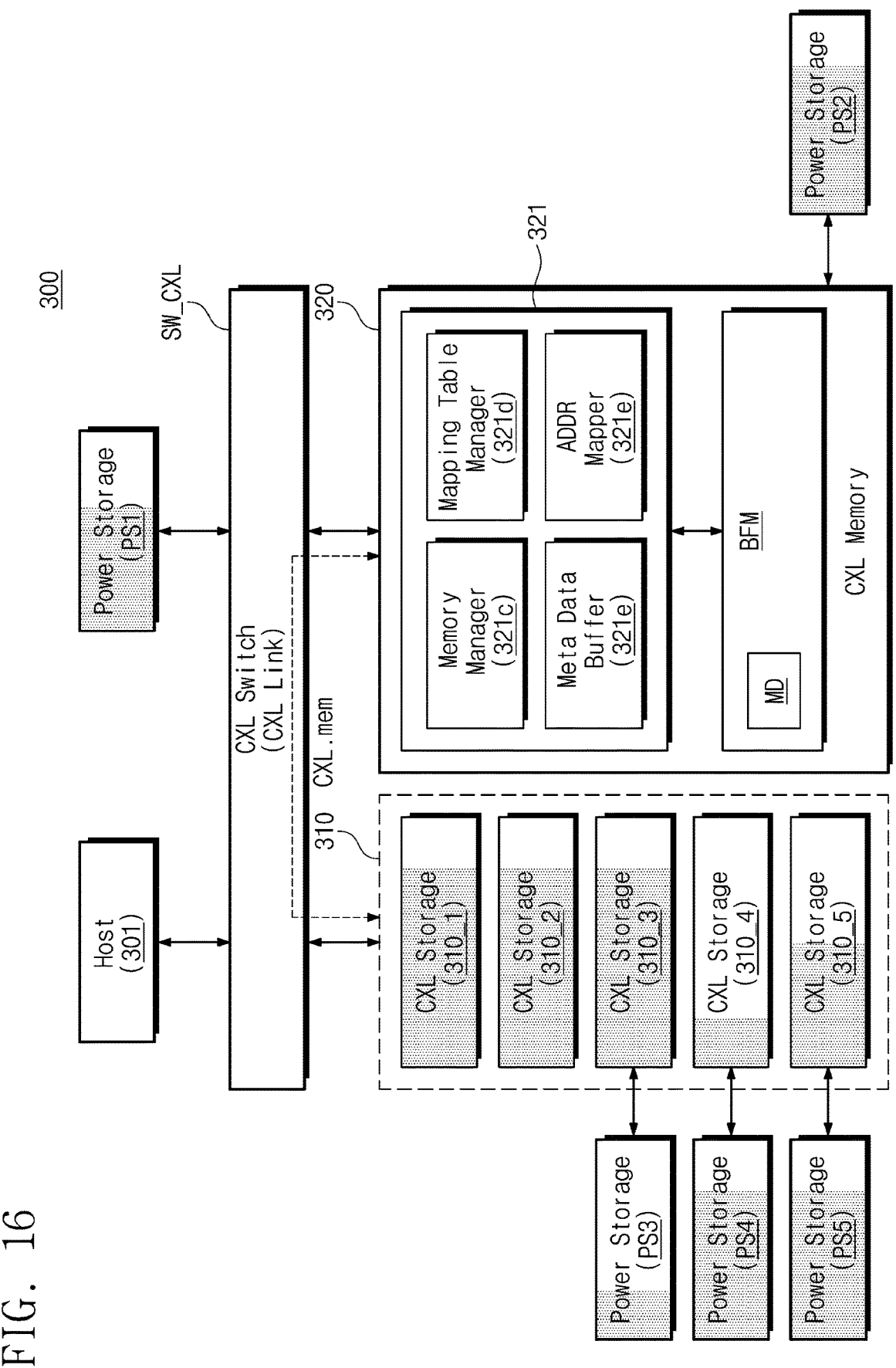
FIG. 16 is a block diagram illustrating components of a computing system according to an embodiment.

FIG. 16 is a block diagram illustrating components of a computing system of FIG. 15 in detail. Referring to FIGS. 3, 15, and 16, the computing system 300 may include the CXL switch SW_CXL, the plurality of CXL storages 310_1 to 310_5, and the CXL memory 320. Components of the CXL memory 320 marked by like reference numerals/signs are substantially identical/similar to the components of the CXL memory 120 of FIG. 4. Thus, additional description associated with the configuration of the CXL memory 320 will be omitted to avoid redundancy.

A configuration of each of the CXL storages 310_1 to 310_5 may be substantially identical/similar to the configuration of the CXL storage 110 of FIG. 4. However, a power storage PS may not be connected with at least some of the CXL storages 310_1 to 310_5. An embodiment where the power storage is not connected with the CXL storages 310_1 and 310_2 and power storages PS3, PS4, and PS5 are respectively connected with the CXL storages 310_3 to 310_5 is illustrated. In an embodiment, a gray portion of the power storage indicates a residual power, and a gray portion of the CXL storage indicates data stored therein. Accordingly, the residual power of the power storages PS4 and PS5 may be greater than the residual power of the power storage PS3, and the residual storage space of the CXL storage 310_4 may be greater than the residual storage spaces of the CXL storages 3101, 3102, 3103 and 3105.

While the computing system 300 operates, the CXL memory 320 may store the map data MD associated with the CXL storages 310_1 to 310_5 in the buffer memory BFM. When the sudden power-off (SPO) event is detected, the CXL memory 320 may store the pieces of map data MD in at least one of the CXL storages 310_3 to 310_5. In this case, the CXL memory 320 may consider the residual power of each of the power storages PS3 to PS5, the residual storage space of each of the CXL storages 310_3 to 310_5, an input/output bandwidth of each of the CXL storages 310_3 to 310_5, etc.

In an embodiment, in the sudden power-off (SPO), CXL storages (e.g., 310_1 and 310_2) with which the power storage is not connected may not operate normally. Therefore, the CXL memory 320 may not store the pieces of map data MD in the CXL storages 310_1 and 310_2.

When the sudden power-off (SPO) event occurs, the CXL memory 320 may not store data present in input/output buffers (e.g., 111c of FIG. 4) of CXL storages (e.g., 310_1 and 310_2) not connected with the power storage in the CXL storages 310_3 to 310_5. Instead, the CXL memory 320 may check the map data MD of the CXL storages (e.g., 310_1 and 310_2) not connected with the power storage and may check and mark the write data present in the input/output buffers of the CXL storages 310_1 and 310_2. Herein, the marked data may be stored together when the map data MD and the meta data are stored in the CXL storages 310_3 to 310_5. In the sudden power-off recovery (SPOR), the CXL memory 320 may send the marked data to the host 301 and may request the host 301 to again send the marked data.

Before the sudden power-off (SPO) event occurs, a memory manager 321c may determine priorities of the CXL storages, in which the map data MD and the meta data are to be stored, from among the CXL storages 310_1 to 310_5. For example, the memory manager 321c may collect information of each CXL storage through the journaling periodically or randomly. For example, the information collected through the journaling may include the following for each of the CXL storages 310_3 to 310_5: a residual power, a residual capacity, and an input/output bandwidth.

The number of CXL storages where the map data MD and the meta data are stored and the priorities thereof may be determined according to the sudden power-off (SPO) policy.

In an embodiment, the memory manager 321c may store the map data MD and the meta data present in the buffer memory BFM in one CXL storage. In this case, the memory manager 321c may assign the highest priority to CXL storages (i.e., 310_4 and 310_5) connected with the power storages (i.e., PS4 and PS5) whose residual power is the greatest. Also, the memory manager 321c may assign the highest priority to the CXL storage 310_4 whose residual storage space is the greatest. In addition, the memory manager 321c may assign the highest priority to the CXL storage 310_4 in consideration of the residual power and the residual storage space. Alternatively, the memory manager 321c may assign the highest priority to CXL storage, which has the smallest input/output bandwidth (i.e., in which the amount of data exchanged with a host is the smallest), from among the CXL storages 310_1 to 310_5.

The memory manager 321c may send the map data MD and the meta data to one CXL storage whose priority is the highest. For example, the memory manager 321c may send data by using a unicast scheme.

In another embodiment, the memory manager 321c may store the map data MD and the meta data in a plurality of CXL storages. In this case, the priority to store the map data MD and the meta data may be determined based on at least one of a residual power of power storage, a residual storage space of CXL storage, and an input/output bandwidth of CXL storage. For example, based on the residual power of the power storage and the residual storage space of the CXL storage, the memory manager 321c may assign the highest priority to the CXL storage 310_4, may assign the second highest priority to the CXL storage 310_5, and may assign the lowest priority to the CXL storage 310_3.

The memory manager 321c may send the map data MD and the meta data to a plurality of CXL storages to which the priorities are assigned. For example, the memory manager 321c may send data to the plurality of CXL storages by using a broadcast scheme or a multicast scheme.

In the case where the memory manager 321c stores the map data MD and the meta data in the plurality of CXL storages, the map data MD and the meta data may be stored in various schemes. For example, the memory manager 321c may copy the map data MD and/or the meta data so as to be stored in a plurality of CXL storages. Alternatively, the memory manager 321c may divide the map data MD and the meta data so as to be stored in a plurality of CXL storages.

After the map data MD and the meta data are stored in at least one CXL storage, the computing system 300 may be powered off. Afterwards, in the sudden power-off recovery (SPOR) operation, as in the scheme described with reference to FIG. 13, the map data MD and the meta data stored in the CXL storage(s) may be recovered in the CXL memory.

In an embodiment, in the case where single data are stored in one CXL storage, the sudden power-off recovery (SPOR) may be performed in the same scheme as described with reference to FIG. 13.

In an embodiment, in the case where data are divided and stored in a plurality of CXL storages, the memory manager 321c may sequentially retrieve the meta data stored in the CXL storages 310_3 to 310_5. Based on the found meta data, the memory manager 321c may sequentially send the request for the map data MD to be recovered to the CXL storages 310_3 to 310_5, and may sequentially receive the map data MD from the CXL storages 310_3 to 310_5. The memory manager 321c may store (or recover) the received map data MD in the buffer memory BFM.

In an embodiment, in the case where data are copied and stored in a plurality of CXL storages, the memory manager 321c may load and compare the map data MD respectively stored in CXL storages. The memory manager 321c may compare the loaded map data and may regard, as original data, the pieces of map data MD coinciding with each other. For example, in the case where pieces of map data respectively loaded from the CXL storages 310_3 and 310_4 coincide with each other and the pieces of map data loaded from the CXL storages 310_3 and 310_4 and map data loaded from the CXL storage 310_5 are different from each other, the memory manager 321c may regard, as original map data, the map data loaded from the CXL storages 310_3 and 310_4.

Figure 17:
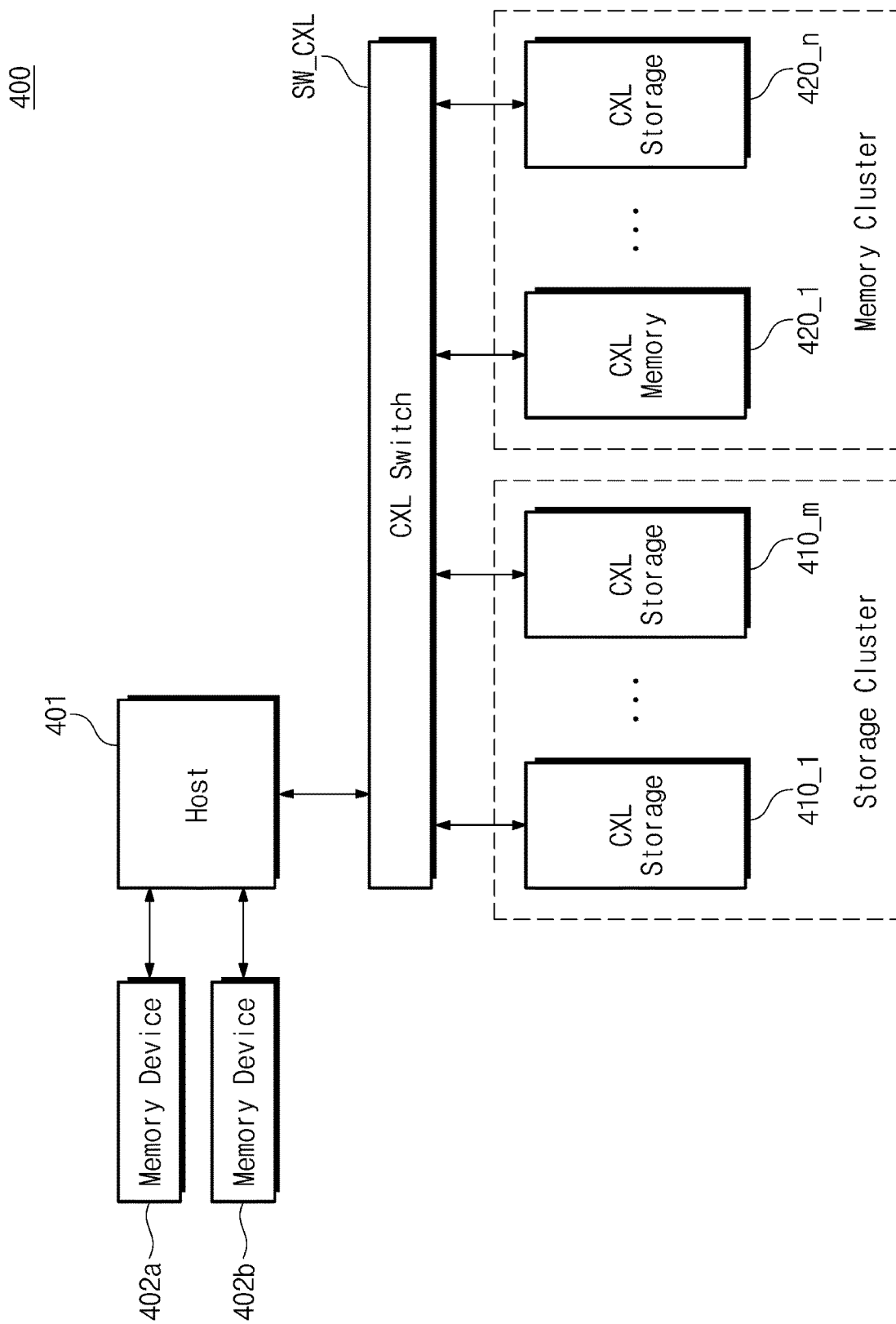
FIG. 17 is a block diagram illustrating a computing system according to an embodiment.

FIG. 17 is a block diagram illustrating a computing system according to an embodiment. Below, for convenience of description, additional description associated with the components described above will be omitted to avoid redundancy. Referring to FIG. 17, a computing system 400 may include a host 401, a plurality of memory devices 402a and 402b, the CXL switch SW_CXL, a plurality of CXL storages 410_1 to 410_m, and a plurality of CXL memories 420_1 to 420_n.

The host 401 may be directly connected with the plurality of memory devices 402a and 402b. The host 401, the plurality of CXL storages 410_1 to 410_m, and the plurality of CXL memories 420_1 to 420_n may be connected with the CXL switch SW_CXL and may communicate with each other through the CXL switch SW_CXL.

In an embodiment, each of the plurality of CXL storages 410_1 to 410_m may have a structure similar to that of the CXL storage 110 described with reference to FIGS. 2 to 10, and each of the plurality of CXL memories 420_1 to 420_n may have a structure similar to that of the CXL memory 120 described with reference to FIGS. 2 to 10. The host 401 may manage the plurality of CXL storages 410_1 to 410_m as one storage cluster, and may mange the plurality of CXL memories 420_1 to 420_n as one memory cluster. The host 401 may allocate a partial area of the memory cluster for a dedicated area (i.e., an area for storing map data of the storage cluster) of the storage cluster. Alternatively, the host 401 may allocate areas of the CXL memories 420_1 to 420_n for dedicated areas of the respective CXL storages 410_1 to 410_m.

In an embodiment, when the sudden power-off (SPO) event occurs, one of the CXL memories 420_1 to 420_n may store the map data MD and the meta data in at least one of the CXL storages 410_1 to 410_m in a scheme similar to that described with reference to FIG. 16. In the sudden power-off recovery (SPOR), one of the CXL memories 420_1 to 420_n may load the map data MD and the meta data from at least one of the CXL storages 410_1 to 410m in a scheme similar to that described with reference to FIG. 16, so as to be stored (i.e., recovered) in at least one of the CXL memories 420_1 to 420_n.

Figure 18:
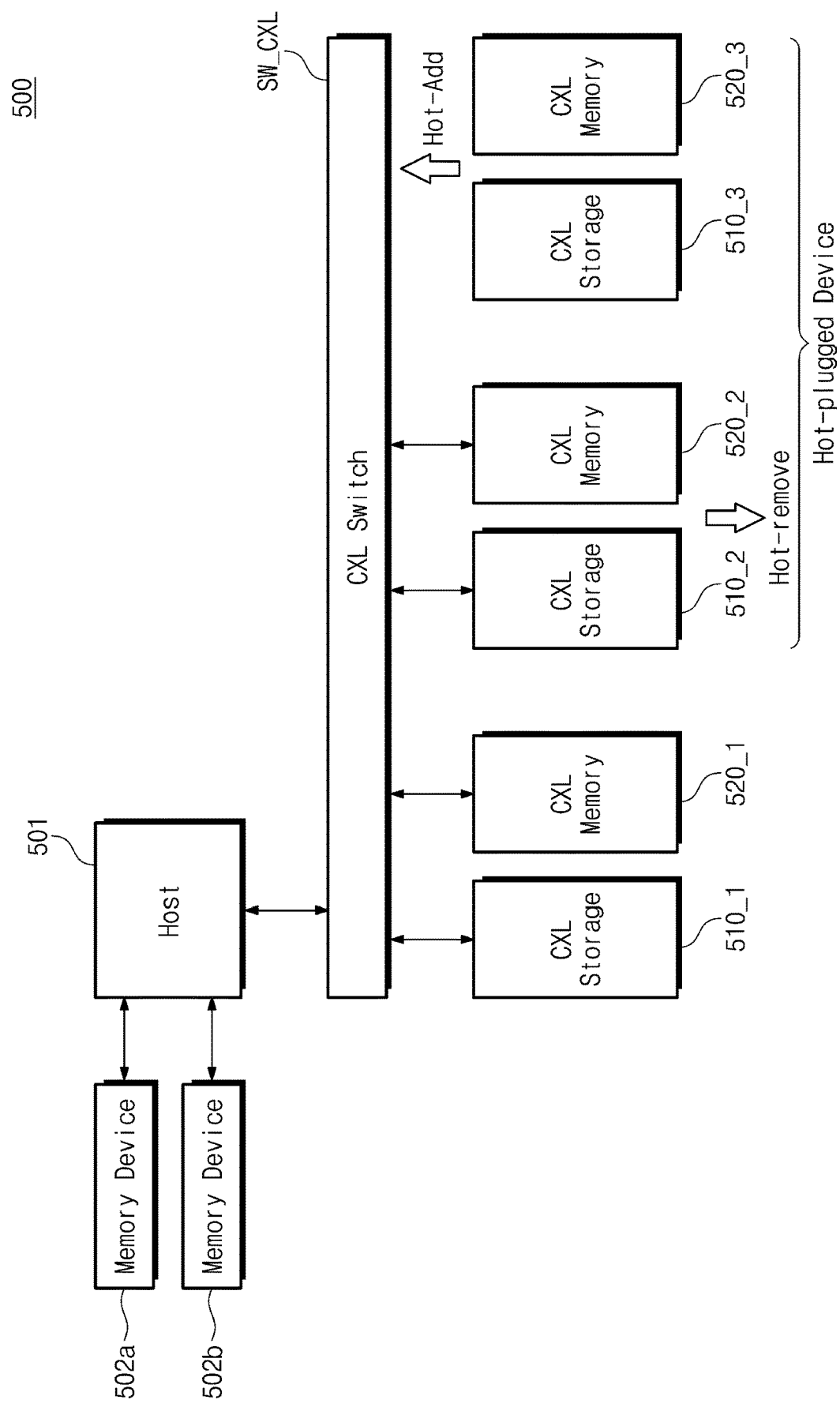
FIG. 18 is a block diagram illustrating a computing system according to an embodiment.

FIG. 18 is a block diagram illustrating a computing system according to an embodiment. Below, for convenience of description, additional description associated with the components described above will be omitted to avoid redundancy. Referring to FIG. 18, a computing system 500 may include a host 501, a plurality of memory devices 502a and 502b, the CXL switch SW_CXL, a plurality of CXL storages 510_1, 510_2, and 510_3, and a plurality of CXL memories 520_1, 520_2, and 520_3.

The host 501 may be directly connected with the plurality of memory devices 502a and 502b. The host 501, the plurality of CXL storages 510_1 and 510_2, and the plurality of CXL memories 520_1 and 520_2 may be connected with the CXL switch SW_CXL and may communicate with each other through the CXL switch SW_CXL. As in the above description, a partial area of the CXL memories 520_1 and 520_2 may be allocated for a dedicated area of the CXL storages 510_1 and 510_2.

In an embodiment, each of the plurality of CXL storages 510_1, 510_2 and 510_3 may have a structure similar to that of the CXL storage 110 described with reference to FIGS. 2 to 10, and each of the plurality of CXL memories 520_1, 520_2 and 520_3 may have a structure similar to that of the CXL memory 120 described with reference to FIGS. 2 to 10. While the computing system 500 is being driven, some of the CXL storages 510_1 and 510_2 or some of the CXL memories 520_1 and 520_2 may be hot-removed from the CXL switch SW_CXL. Alternatively, while the computing system 500 is being driven, the CXL storage 510_3 or the CXL memory 520_3 may be hot-added to the CXL switch SW_CXL. In this case, the host 501 may again perform memory allocation by again performing the initialization operation on devices connected with the CXL switch SW_CXL through the reset operation or the hot-plug operation. That is, CXL storage and a CXL memory according to an embodiment may support the hot-plug function and may make it possible to expand a storage capacity and a memory capacity of a computing system through various connections.

Figure 19:
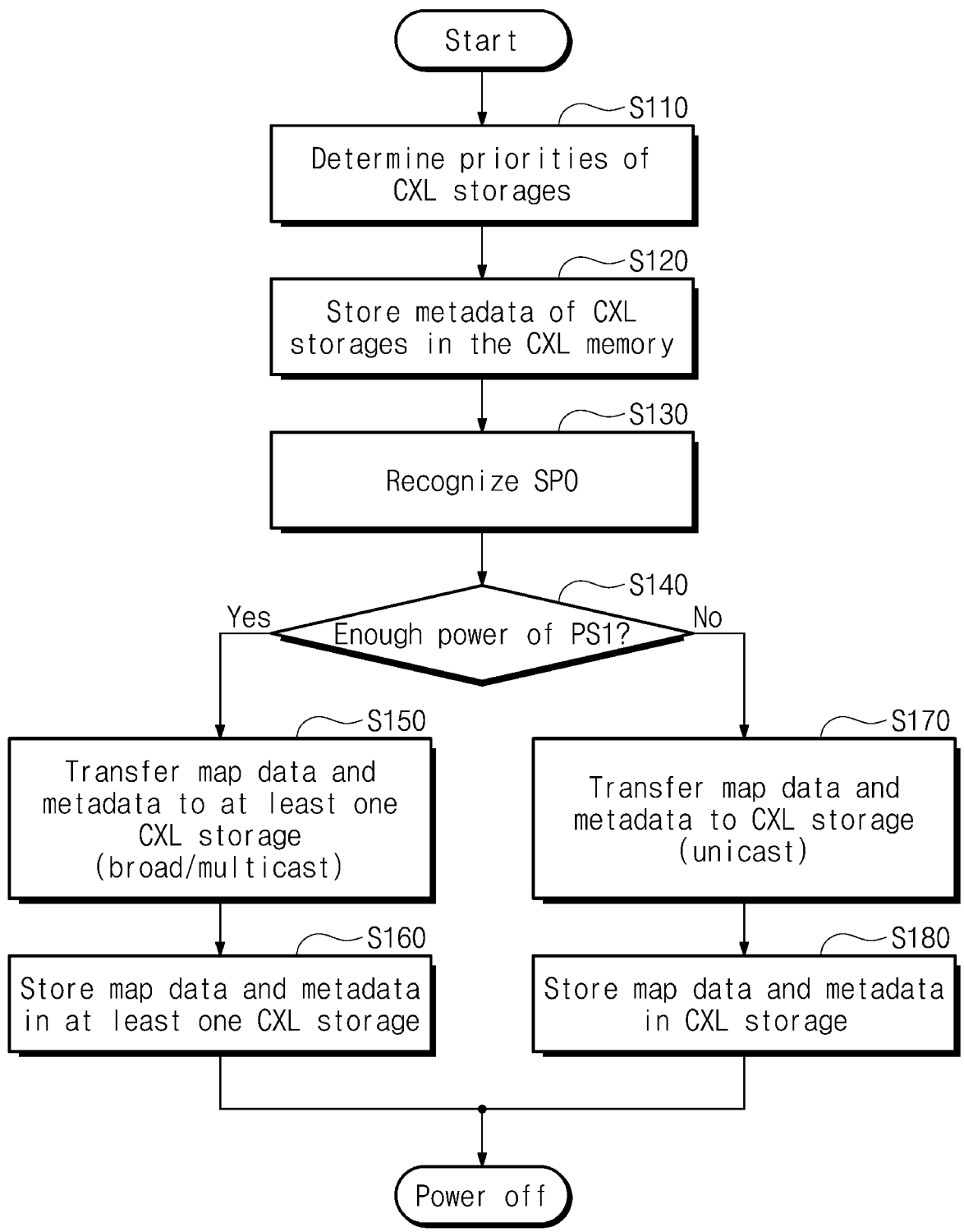
FIG. 19 illustrates a method of operating CXL storage and a CXL memory according to an embodiment.

FIG. 19 illustrates a method of operating CXL storage and a CXL memory according to an embodiment.

Referring to FIGS. 16 and 19, in operation S110, the memory manager 321c of the CXL memory 320 may collect information about each CXL storage and may determine priorities of the CXL storages 310_1 to 310_5 for the purpose of storing the map data MD and the meta data. For example, the storage information collected by the memory manager 321c may include at least one of a residual power of power storage connected with each CXL storage, a residual storage space of each CXL storage, and an input/output bandwidth of each CXL storage.

In operation S120, the memory manager 321c may obtain the meta data of the CXL storages 310_1 to 310_5 through the periodical or random journaling, and may store the obtained meta data in the buffer memory BFM of the CXL memory 320. The memory manager 321c may update the map data of the CXL storages 310_1 to 310_5 periodically or randomly, so as to be stored in the buffer memory BFM. The description is given as operation S120 is performed after operation S110 where the priorities of the CXL storages 310_1 to 310_5 are determined; however, operation S120 may be performed before operation S110, or operation S110 and operation S120 may be simultaneously performed.

In operation S130, the computing system 300 may recognize the sudden power-off (SPO) event. For example, in response to a power supply voltage supplied through a power rail decreasing or in response to a signal received from the host 301, CXL storage (e.g., at least one of 310_1 to 310_5) or the CXL memory 320 may recognize that the sudden power-off (SPO) event has occurred. In response to the detection of the sudden power-off event, the CXL storages 310_1 to 310_5 and/or the CXL memory 320 may operate the corresponding power storages.

In operation S140, whether a residual power of the power storage PS1 connected with the CXL switch SW_CXL is sufficient may be determined. For example, based on the information about the residual power of the power storage PS1 previously obtained in operation S310, the memory manager 321c may determine whether the communication using the broadcast or multicast scheme is possible between the CXL storages 310_1 to 310_5 and the CXL memory 320. For example, when a value of the residual power of the power storage PS1 is greater than or equal to a given value (i.e., a threshold value), the memory manager 321c may determine that the communication using the broadcast or multicast scheme is possible.

When it is determined that the amount of residual power of the power storage PS1 is sufficient (i.e., greater than or equal to the given value), the map data MD and the meta data stored in the CXL memory 320 may be transferred to at least one of the CXL storages 310_1 to 310_5 through the broadcast or multicast scheme (S150), and the map data MD and the meta data thus transferred may be stored in a nonvolatile memory (e.g., NVM of FIG. 4) of at least one of the CXL storages 310_1 to 310_5 through an input/output buffer (e.g., 111c of FIG. 4) (S160).

When it is determined that the amount of residual power of the power storage PS1 is not sufficient (i.e., less than the given value), the map data MD and the meta data stored in the CXL memory 320 may be transferred to at least one of the CXL storages 310_1 to 310_5 through the unicast scheme (S170), and the map data MD and the meta data thus transferred may be stored in the nonvolatile memory NVM of CXL storage through the input/output buffer (S180).

When the map data MD and the meta data are completely stored, the computing system 300 may be powered off.

Figure 20:
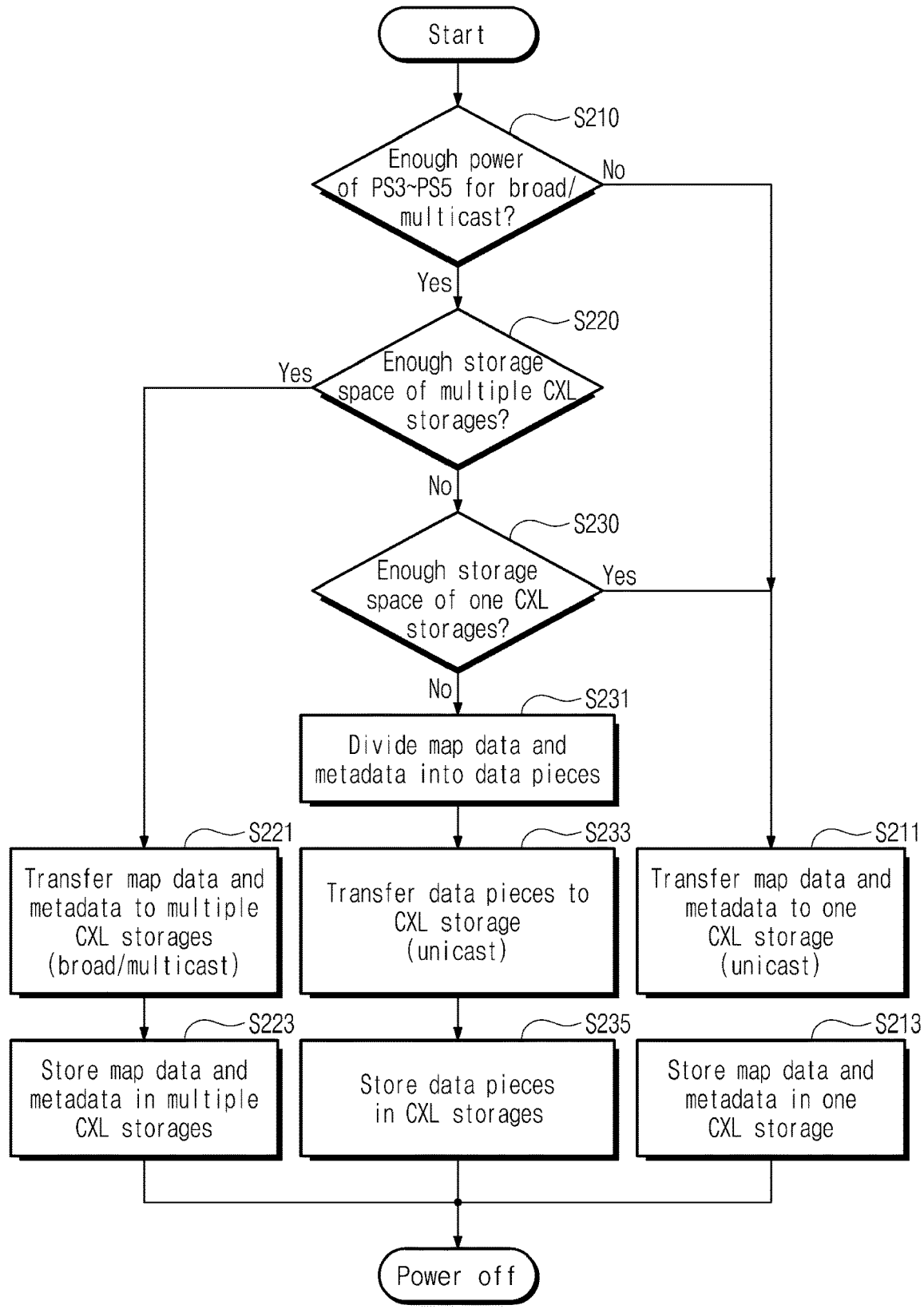
FIG. 20 is a flowchart illustrating operation S160 of FIG. 19 in detail according to an embodiment.

FIG. 20 is a flowchart illustrating operation S160 of FIG. 19 in detail.

Referring to FIGS. 16 and 20, in operation S210, the memory manager 321c of the CXL memory 320 may determine whether the residual power of each of the power storages PS3 to PS5 respectively connected with the CXL storages 310_3 to 310_5 is sufficient (i.e., greater than or equal to the given value) to perform the broadcast/multicast-based communication between the CXL memory 320 and the corresponding CXL storage.

When it is determined that the residual powers of the power storages PS3 to PS5 are not sufficient (No, i.e., less than the given value), the map data MD and the meta data may be transferred to the CXL storage, to which the highest priority is assigned, by using the unicast scheme (S211), and the map data MD and the meta data thus transferred may be stored in the nonvolatile memory NVM of the CXL storage to which the highest priority is assigned (S213).

In contrast, when it is determined that the residual power of each of the power storages PS3 to PS5 is sufficient (Yes, i.e., greater than or equal to the given value), the memory manager 321c may determine whether the residual storage space of each of the CXL storages 310_3 to 310_5 respectively connected with the power storages PS3 to PS5 is sufficient to store the map data MD and the meta data.

When it is determined that the residual storage space of each of the CXL storages 310_3 to 310_5 is sufficient (Yes), the map data MD and the meta data may be transferred to each of the CXL storages 310_3 to 310_5 in the broadcast/multicast scheme (S221), and each of the CXL storages 310_3 to 310_5 may store the map data MD and the meta data (S223). That is, the map data MD and the meta data may be copied to be stored in the CXL storages 310_3 to 310_5.

In contrast, when it is determined that the residual storage space of each of the CXL storages 310_3 to 310_5 is not sufficient (No), the memory manager 321c may determine whether the residual storage space of any one of the CXL storages 310_3 to 310_5 is sufficient to store the map data MD and the meta data.

When it is determined that the residual storage space of any one of the CXL storages 310_3 to 310_5 is sufficient (Yes), the map data MD and the meta data may be transferred to the CXL storage, to which the highest priority is assigned, by using the unicast scheme (S211), and the map data MD and the meta data thus transferred may be stored in the nonvolatile memory NVM of the CXL storage to which the highest priority is assigned (S213).

When it is determined that the residual storage space of each of the CXL storages 310_3 to 310_5 is not sufficient (No), in operation S231, the memory manager 321c may divide the map data MD and the meta data to a plurality of data pieces. In this case, the size of the divided data piece may be smaller than the size of the residual storage space being the smallest from among the residual storage spaces of the CXL storages 310_3 to 310_5.

In operation S233, the memory manager 321c may send the data pieces to the CXL storages 310_3 to 310_5 according to the priorities. In this case, the data pieces may be transferred according to the unicast scheme. Afterwards, in operation S235, the CXL storages 310_3 to 310_5 may store the received data pieces.

Figure 21:
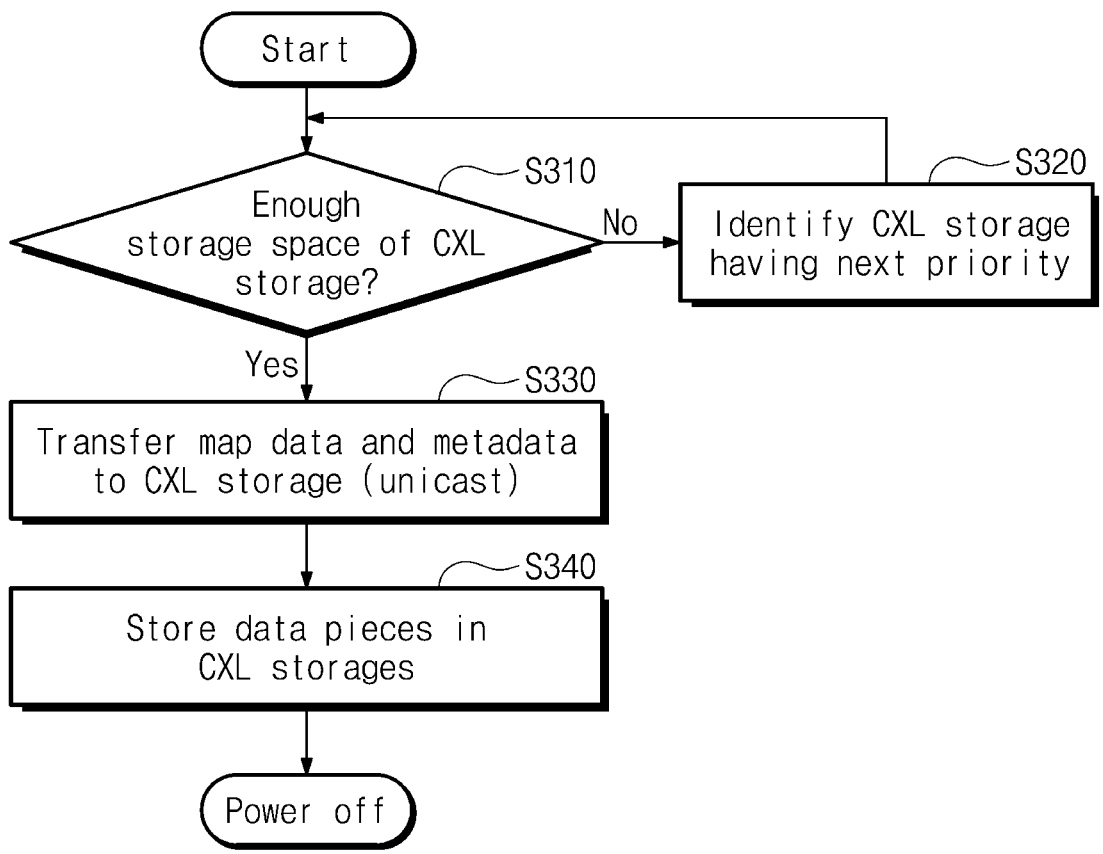
FIG. 21 is a flowchart illustrating operation S170 of FIG. 19 in detail according to an embodiment.

FIG. 21 is a flowchart illustrating operation S170 of FIG. 19 in detail.

Referring to FIGS. 16 and 21, in operation S310, the memory manager 321c of the CXL memory 320 may determine whether the storage space of the CXL storage having the highest priority from among the CXL storages 310_3 to 310_5 is sufficient to store the map data MD and the meta data.

When it is determined that the storage space of the CXL storage having the highest priority is not sufficient (No), the memory manager 321c may identify a CXL storage having a next priority (e.g., second highest priority). Afterwards, the memory manager 321c may determine whether the storage space of the CXL storage having the next priority is sufficient to store the map data MD and the meta data (S310).

In contrast, when it is determined that the storage space of the CXL storage having the highest priority is sufficient (Yes), the memory manager 321c may send the map data MD and the meta data to the CXL storage having the highest priority by using the unicast scheme.

Afterwards, in operation S340, the map data MD and the meta data may be stored in the nonvolatile memory NVM of the CXL storage having the highest priority; after the map data MD and the meta data are completely stored, the computing system 300 may be powered off.

Figure 22:
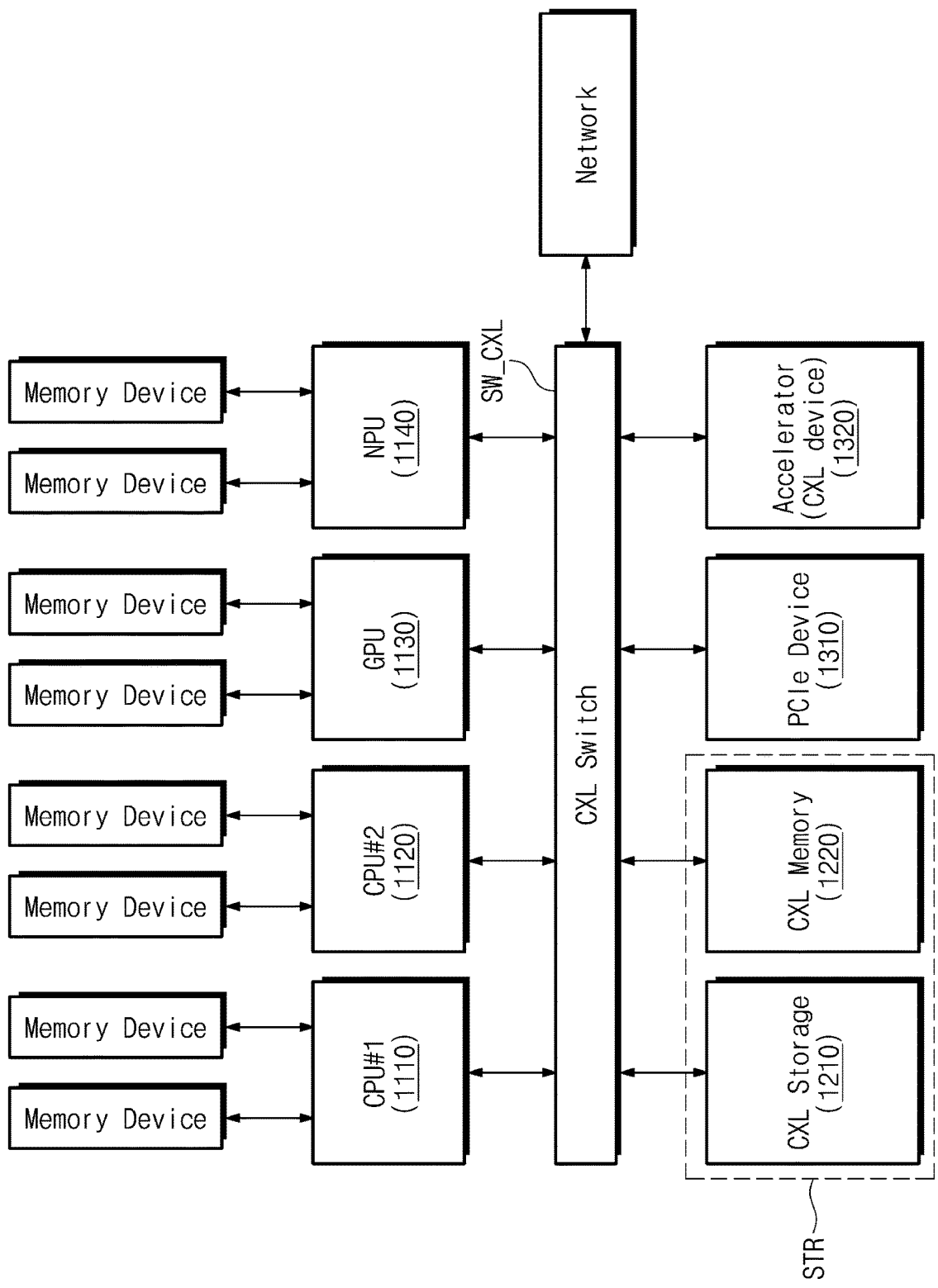
FIG. 22 is a block diagram illustrating a computing system according to an embodiment.

FIG. 22 is a block diagram illustrating a computing system according to an embodiment. For convenience of description, additional description associated with the components described above will be omitted to avoid redundancy. Referring to FIG. 22, a computing system 1000 may include a first CPU 1110, a second CPU 1120, a GPU 1130, an NPU 1140, the CXL switch SW_CXL, CXL storage 1210, a CXL memory 1220, a PCIe device 1310, and an accelerator (CXL device) 1320.

The first CPU 1110, the second CPU 1120, the GPU 1130, the NPU 1140, the CXL storage 1210, the CXL memory 1220, the PCIe device 1310, and the accelerator (CXL device) 1320 may be connected in common with the CXL switch SW_CXL and may communicate with each other through the CXL switch SW_CXL.

In an embodiment, each of the first CPU 1110, the second CPU 1120, the GPU 1130, and the NPU 1140 may be the host described with reference to FIGS. 1 to 14 and may be directly connected with individual memory devices.

In an embodiment, the CXL storage 1210 and the CXL memory 1220 may be the CXL storage and the CXL memory described with reference to FIGS. 2 to 18, and at least a partial area of the CXL memory 1220 may be allocated for an area dedicated for the CXL storage 1210 by one or more of the first CPU 1110, the second CPU 1120, the GPU 1130, and the NPU 1140. That is, the CXL storage 1210 and the CXL memory 1220 may be used as a storage space STR of the computing system 1000.

In an embodiment, the CXL switch SW_CXL may be connected with the PCIe device 1310 or the accelerator 1320 configured to support various functions, and the PCIe device 1310 or the accelerator 1320 may communicate with each of the first CPU 1110, the second CPU 1120, the GPU 1130, and the NPU 1140 through the CXL switch SW_CXL or may access the storage space STR including the CXL storage 1210 and the CXL memory 1220 through the CXL switch SW_CXL.

In an embodiment, the CXL switch SW_CXL may be connected with an external network or Fabric and may be configured to communicate with an external server through the external network or Fabric.

Figure 23:
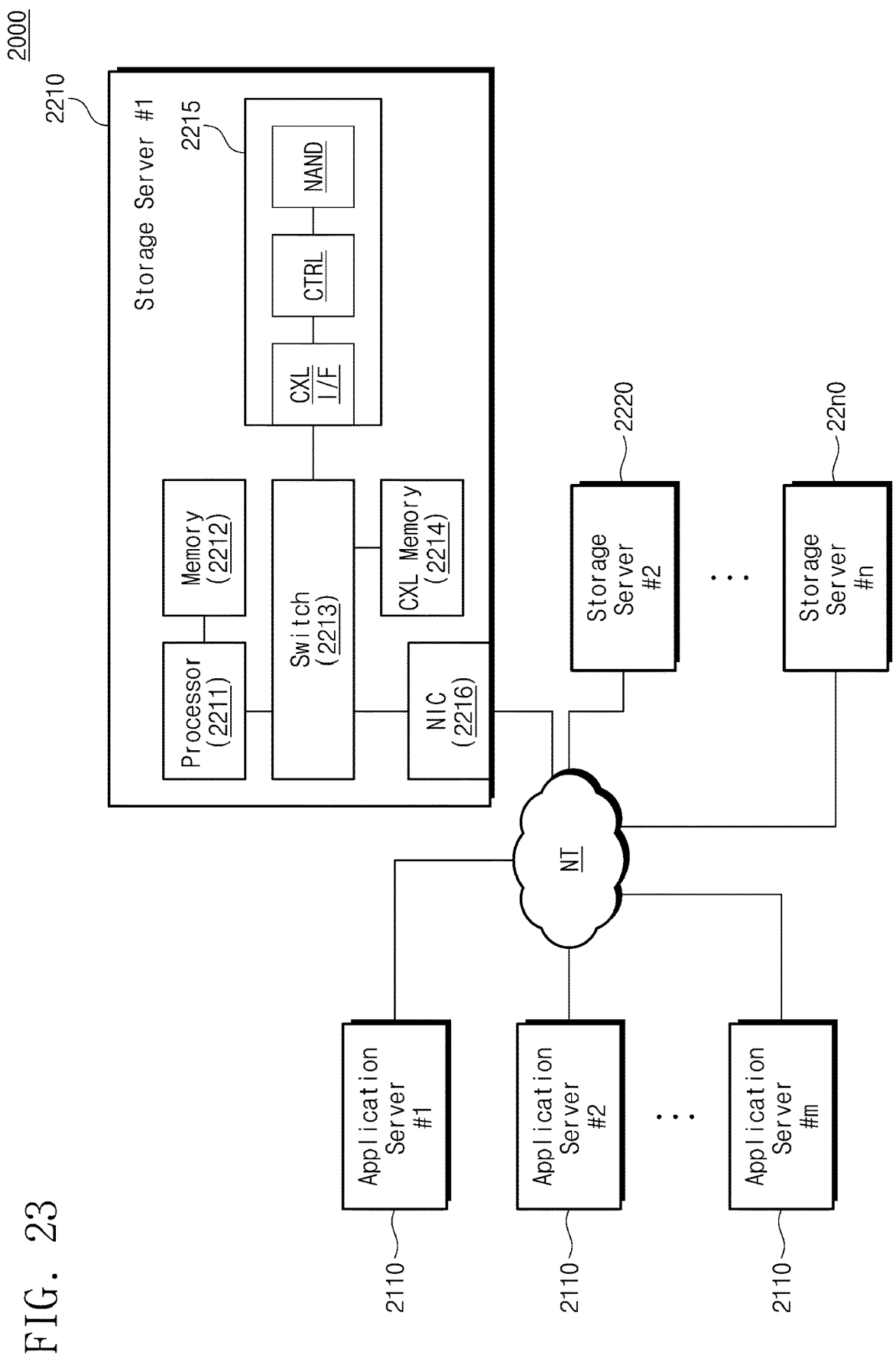
FIG. 23 is a block diagram illustrating a data center according to an embodiment.

FIG. 23 is a block diagram illustrating a data center to which a computing system according to the present disclosure is applied. Referring to FIG. 23, a data center 2000 that is a facility collecting various data and providing services may be referred to as a "data storage center". The data center 2000 may be a system for operating a search engine and a database, and may be a computing system used in a business such as a bank or in a government institution. The data center 2000 may include application servers 2110 to 21m0 and storage servers 2210 to 22n0. The number of application servers and the number of storage servers may be variously selected, and the number of application servers and the number of storage servers may be different from each other.

Below, a configuration of the first storage server 2210 will be mainly described. The application servers 2110 to 21m0 may have similar structures, the storage servers 2210 to 22n0 may have similar structures, and the application servers 2110 to 21m0 and the storage servers 2210 to 22n0 may communicate with each other over a network NT.

The first storage server 2210 may include a processor 2211, a memory 2212, a switch 2213, a storage device 2215, a CXL memory 2214, and a network interface card (NIC) 2216. The processor 2211 may control an overall operation of the first storage server 2210 and may access the memory 2212 to execute an instruction loaded onto the memory 2212 or to process data. The memory 2212 may be implemented with a Double Data Rate Synchronous DRAM (DDR SDRAM), a High Bandwidth Memory (HBM), a Hybrid Memory Cube (HMC), a Dual In-line Memory Module (DIMM), an Optane DIMM, and/or a Non-Volatile DIMM (NVMDIMM). The processor 2211 and the memory 2212 may be directly connected, and the numbers of processors and memories included in one storage server 2210 may be variously selected.

In an embodiment, the processor 2211 and the memory 2212 may provide a processor-memory pair. In an embodiment, the number of processors 2211 and the number of memories 2212 may be different from each other. The processor 2211 may include a single core processor or a multi-core processor. The detailed description of the storage server 2210 may be similarly applied to the application servers 2110 to 21m0.

The switch 2213 may be configured to arbitrate or route the communications between various components included in the first storage server 2210. In an embodiment, the switch 2213 may be implemented with the CXL switch SW_CXL described with reference to FIGS. 1 to 15. That is, the switch 2213 may be a switch implemented based on the CXL protocol.

The CXL memory 2214 may be connected with the switch 2213. In an embodiment, the CXL memory 2214 may be used as a memory expander for the processor 2211. Alternatively, as described with reference to FIGS. 1 to 21, the CXL memory 2214 may be allocated as a dedicated memory or a buffer memory of the storage device 2215.

The storage device 2215 may include a CXL interface circuit CXL_IF, a controller CTRL, and a NAND flash NAND. According to a request of the processor 2211, the storage device 2215 may store data or may output the stored data. In an embodiment, the storage device 2215 may be implemented with the CXL storage described with reference to FIGS. 1 to 21. In an embodiment, as in the description given with reference to FIGS. 1 to 21, at least a partial area of the CXL memory 2214 may be allocated for a dedicated area, and the dedicated area may be used as a buffer memory (i.e., may be used to store map data in the CXL memory 2214).

According to an embodiment, the application servers 2110 to 21m0 may not include the storage device 2215. The storage server 2210 may include at least one or more storage devices 2215. The number of storage devices 2215 included in the storage server 2210 may be variously selected.

The NIC 2216 may be connected with the CXL switch SW_CXL. The NIC 2216 may communicate with the remaining storage servers 2220 to 22n0 or the application servers 2210 to 21m0 over the network NT.

In an embodiment, the NIC 2216 may include a network interface card, a network adapter, etc. The NIC 2216 may be connected with the network NT by a wired interface, a wireless interface, a Bluetooth interface, an optical interface, etc. The NIC 2216 may include an internal memory, a digital signal processor (DSP), a host bus interface, etc. and may be connected with the processor 2211 and/or the switch 2213 through the host bus interface. In an embodiment, the NIC 2216 may be integrated with at least one of the processor 2211, the switch 2213, and the storage device 2215.

In an embodiment, the network NT may be implemented by using a Fibre channel (FC) or an Ethernet. In this case, the FC may be a medium that is used in high-speed data transmission and may use an optical switch that provides high performance/high availability. Storage servers may be provided as file storage, block storage, or object storage according to an access manner of the network NT.

In an embodiment, the network NT may be a storage-dedicated network such as a storage area network (SAN). For example, the SAN may be a FC-SAN that uses a FC network and is implemented according to a FC protocol (FCP). For another example, the SAN may be an IP-SAN that uses a TCP/IP network and is implemented according to an iSCSI (SCSI over TCP/IP or Internet SCSI). In an embodiment, the network NT may be a legacy network such as a TCP/IP network. For example, the network NT may be implemented according to the following protocol: FC over Ethernet (FCoE), Network Attached Storage (NAS), or NVMe over Fabrics (NVMe-oF).

In an embodiment, at least one of the application servers 2110 to 21m0 may store data, which are store-requested by a user or a client, in one of the storage servers 2210 to 22n0 over the network NT. At least one of the application servers 2210 to 21m0 may obtain data, which are read-requested by the user or the client, from one of the storage servers 2210 to 22n0 over the network NT. For example, at least one of the application servers 2210 to 21m0 may be implemented with a web server, a database management system (DBMS), etc.

In an embodiment, at least one of the application servers 2210 to 21m0 may access a memory, a CXL memory, or a storage device included in any other application server over the network NT or may access memories, CXL memories, or storage devices included in the storage servers 2210 to 22n0 over the network NT. As such, at least one of the application servers 2110 to 21m0 may perform various operations on data stored in the remaining application servers and/or storage servers. For example, at least one of the application servers 2110 to 21m0 may execute an instruction for moving or copying data between the remaining application servers and/or storage servers. In this case, the data may be moved from storage devices of storage servers to memories or CXL memories of application servers through memories or CXL memories of the storage servers or directly. The data that are transferred over a network may be data that are encrypted for security or privacy.

In an embodiment, a CXL memory included in at least one of the application servers 2110 to 21m0 and the storage servers 2210 to 22n0 may be allocated for a dedicated area of a storage device included in at least one of the application servers 2110 to 21m0 and the storage servers 2210 to 22n0, and the storage device may use the dedicated area thus allocated as a buffer memory (i.e., may store map data in the dedicated area). For example, a CXL memory included in a storage server (e.g., 22n0) may be allocated to the storage device 2215 included in the storage server 2210, and the storage device 2215 included in the storage server 2210 may access the CXL memory included in the storage server (e.g., 22n0) over the switch 2213 and the NIC 2216. In this case, the map data associated with the storage device 2215 of the first storage server 2210 may be stored in the CXL memory of the storage server 22n0. That is, storage devices and CXL memories of the data center according to the present disclosure may be connected and implemented in various manners.

According to an embodiment, when the sudden power-off event occurs in a storage device in which a high-capacity buffer is not included and/or an external memory device including a high-capacity buffer for the storage device, data present in the external memory device may be safely stored in the storage device.

While aspects of embodiments have been particularly shown and described, it will be understood that various changes in form and details may be made therein without departing from the spirit and scope of the following claims.

What is claimed is:

1. A memory device comprising:
   an interface;
   a buffer memory; and
   a memory controller configured to:
      obtain map data and meta data for recovering the map data from at least one external storage device;
      store the map data and the meta data obtained from the at least one external storage device in the buffer memory, the buffer memory being allocated for the at least one external storage device;
      translate a logical address corresponding to the at least one external storage device into a physical address of the buffer memory; and
      send, using residual power of a power storage connected to the memory device, during a time period between detection of a sudden power-off event and the memory device being powered off, the map data and the meta data to the at least one external storage device in response to detecting the sudden power-off event,
   wherein the memory device is configured to communicate with each of a host and the at least one external storage device via the interface.

2. The memory device of claim 1, wherein the at least one external storage device comprises a plurality of storage devices, and
   wherein the memory controller is configured to obtain information for determining priorities of the plurality of storage devices from the plurality of storage devices, and determine the priorities based on the information.

3. The memory device of claim 2, wherein the information comprises any one or any combination of:
   information about a residual power of a power storage connected with a bus connecting the host, the plurality of storage devices, and the memory device to each other;
   information about a residual power of power storages respectively connected with the plurality of storage devices;
   information about a residual storage space of each of the plurality of storage devices; and
   information about an input/output bandwidth of each of the plurality of storage devices,
   wherein the memory controller is configured to identify the information about the residual power of the power storage connected with the bus, and
   wherein the memory controller is configured to, based on the residual power of the power storage connected with the bus being greater than or equal to a first reference value, store the map data and the meta data in the plurality of storage devices according to the priorities by using a first transfer scheme.

4. The memory device of claim 1, wherein the at least one external storage device comprises a plurality of storage devices,
   wherein the memory controller is configured to identify information about the residual power of the power storage connected with the memory device, and
   wherein the memory controller is configured to, based on the residual power of the power storage being greater than or equal to a first reference value, store the map data and the meta data in the plurality of storage devices according to priorities by using a first transfer scheme.

5. The memory device of claim 4, wherein the memory controller is configured to, based on the residual power of the power storage respectively connected with the plurality of storage devices being greater than or equal to a second reference value, store the map data and the meta data in the plurality of storage devices according to the priorities by using the first transfer scheme.

6. The memory device of claim 4, wherein the memory controller is configured to, based on the residual power of the power storage respectively connected with the plurality of storage devices being smaller than a second reference value:
   select a storage device having a residual storage space for storing the map data and the meta data from among the plurality of storage devices; and
   store the map data and the meta data in the selected storage device by using a second transfer scheme different from the first transfer scheme.

7. The memory device of claim 4, wherein the memory controller is configured to, based on the residual power of the power storage respectively connected with the plurality of storage devices being smaller than a second reference value:
   divide the map data and the meta data into a plurality of data pieces; and
   store the plurality of data pieces in the plurality of storage devices by using a second transfer scheme different from the first transfer scheme.

8. The memory device of claim 4, wherein the memory controller is configured to, based on the residual power of the power storage being smaller than the first reference value, store the map data and the meta data in a storage device having a highest priority of the priorities from among the plurality of storage devices by using a second transfer scheme different from the first transfer scheme.

9. The memory device of claim 1, wherein the interface comprises a compute express link (CXL) interface, and
   wherein the memory device is configured to obtain the map data and the meta data from the at least one external storage device via the CXL interface, and send the map data and the meta data to the at least one external storage device via the CXL interface.

10. The memory device of claim 1, wherein the memory device is configured to communicate with a storage device which does not comprise a dynamic random access memory (DRAM) buffer.

11. A storage device comprising:
    an interface;
    a nonvolatile memory device configured to store user data; and
    a storage controller configured to:
      generate map data corresponding to the nonvolatile memory device, which indicates a mapping relationship between a logical block address and a physical block address, and meta data for recovering the map data;
      send the map data and the meta data to an external memory device comprising a buffer memory allocated for the storage device;
      receive, during a time period between detection of a sudden power-off event and the storage device being powered off, the map data and the meta data output from the external memory device in response to the sudden power-off event; and
      store the received map data and the received meta data in the nonvolatile memory device using residual power of a power storage connected to the storage device,
    wherein the storage device is configured to communicate with each of a host and the external memory device using the interface.

12. The storage device of claim 11, wherein the storage controller is configured to send, to the external memory device, any one or any combination of information about the power storage connected with the storage device, information about a residual storage space of the nonvolatile memory device, and information about an input/output bandwidth of the storage device.

13. The storage device of claim 11, wherein the storage controller is configured to, in a sudden power-off recovery operation, read the map data stored in the nonvolatile memory device in response to a request from the external memory device and send the map data to the external memory device.

14. The storage device of claim 11, wherein the interface comprises a compute express link (CXL) interface, and
    wherein the storage device is configured to obtain the map data and the meta data from the external memory device via the CXL interface, and send the map data and the meta data to the external memory device via the CXL interface.

15. The storage device of claim 11, wherein the storage device does not comprise a dynamic random access memory (DRAM) buffer.

16. A computing system comprising:
a plurality of storage devices, each of which comprises a nonvolatile memory device and a storage controller configured to generate map data of the nonvolatile memory device and meta data for recovering the map data, the map data indicating a mapping relationship between a logical block address and a physical block address; and
a memory device comprising an interface, a memory controller configured to obtain the map data and the meta data from the plurality of storage devices, and a buffer memory configured to store the map data and the meta data, the buffer memory being allocated for the plurality of storage devices; and
wherein the memory device is configured to communicate with each of a host and the plurality of storage devices via the interface, and
wherein the memory controller is configured to send, using residual power of a power storage connected to the memory device, during a time period between detection of a sudden power-off event and the memory device being powered off, the map data and the meta data to the plurality of storage devices in response to detecting the sudden power-off event.

17. The computing system of claim 16, wherein the memory controller is configured to obtain, from the plurality of storage devices, any one or any combination of:
information about a residual power of at least one power storage connected with each of the plurality of storage devices;
information about a residual storage space of the nonvolatile memory device of each of the plurality of storage devices; and
information about an input/output bandwidth of each of the plurality of storage devices.

18. The computing system of claim 17, wherein the memory controller is configured to determine priorities for storing the map data and the meta data present in the buffer memory in the plurality of storage devices, based on the information obtained from the plurality of storage devices.

19. The computing system of claim 18, wherein the memory controller is configured to send the map data and the meta data to the plurality of storage devices according to the priorities in response to detecting the sudden power-off event.

20. The computing system of claim 16, wherein each of the plurality of storage devices does not comprise a dynamic random access memory (DRAM) buffer.

* * * * *